Figure 1:
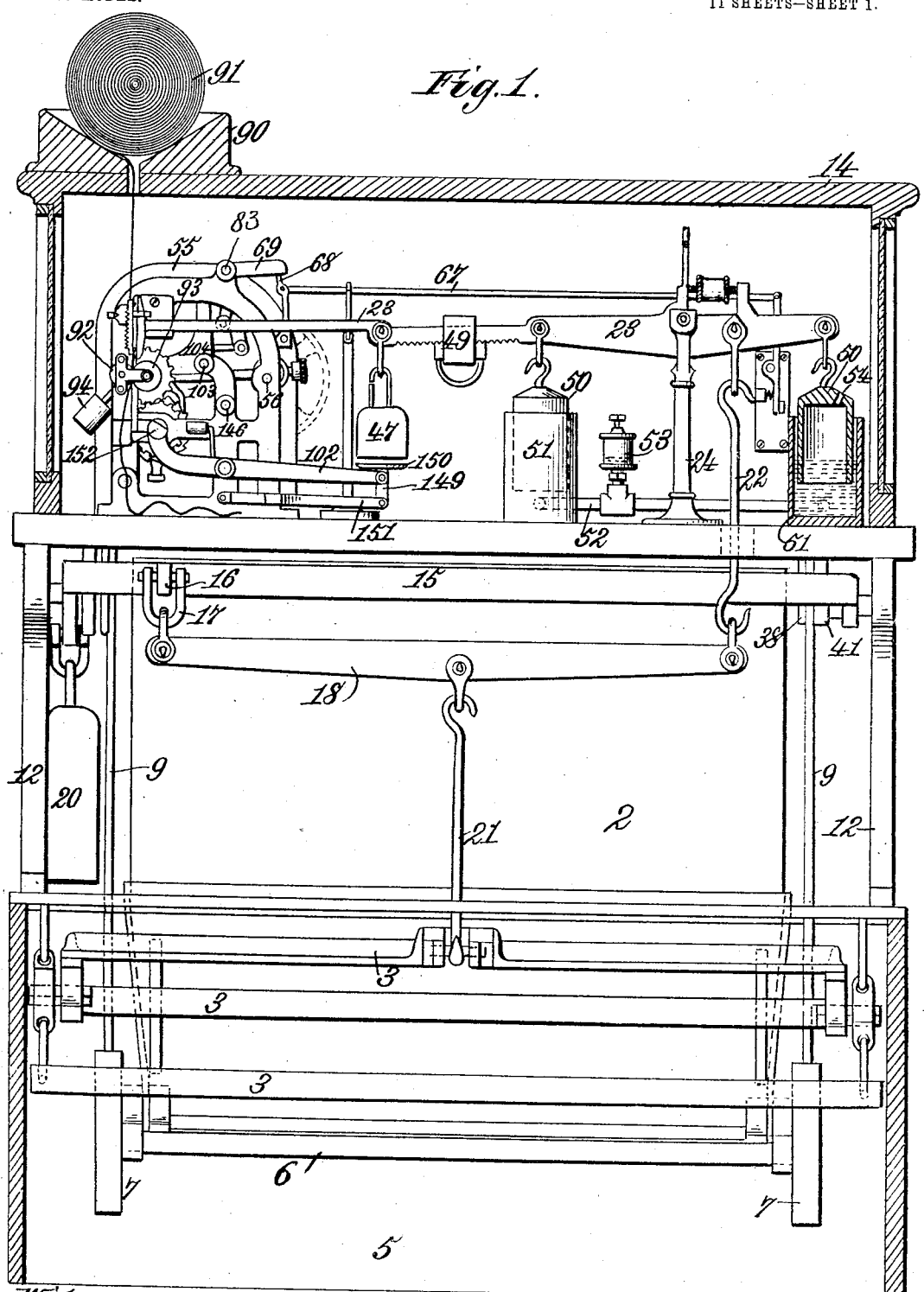

No. 764,530. PATENTED JULY 5, 1904.
U. S. JAMES.
WEIGHING APPARATUS.
APPLICATION FILED NOV. 12, 1903.
NO MODEL. 11 SHEETS—SHEET 1.

Witnesses.
Robert Everett.
James L. Norris, Jr.

Inventor.
Ulysses S. James.
By James L. Norris, Atty.

No. 764,530. PATENTED JULY 5, 1904.
U. S. JAMES.
WEIGHING APPARATUS.
APPLICATION FILED NOV. 12, 1903.

NO MODEL. 11 SHEETS—SHEET 2.

Fig. 2.

Witnesses.
Robert Garrett.
James L. Norris, Jr.

Inventor:
Ulysses S. James.
By James L. Norris, Atty.

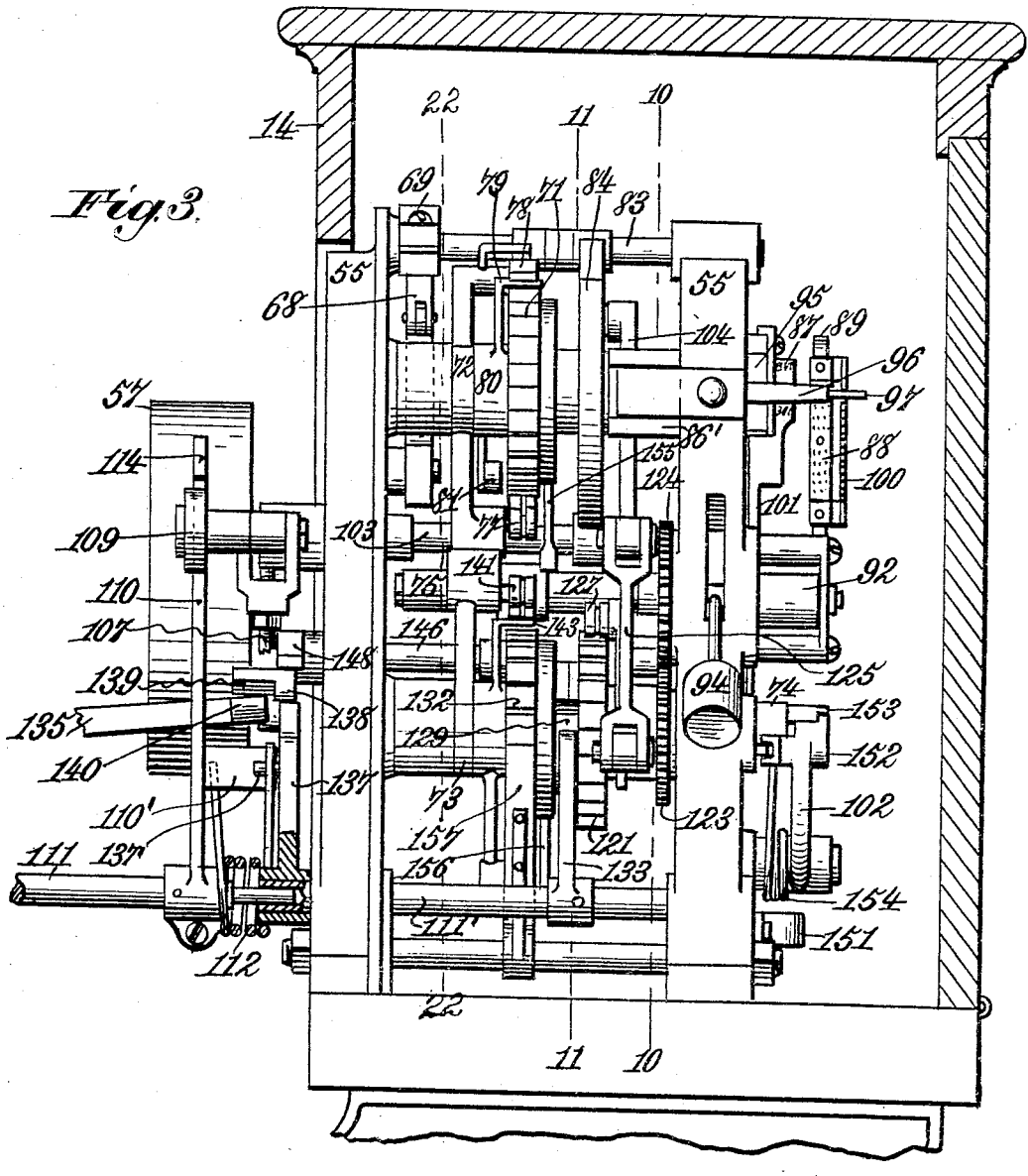

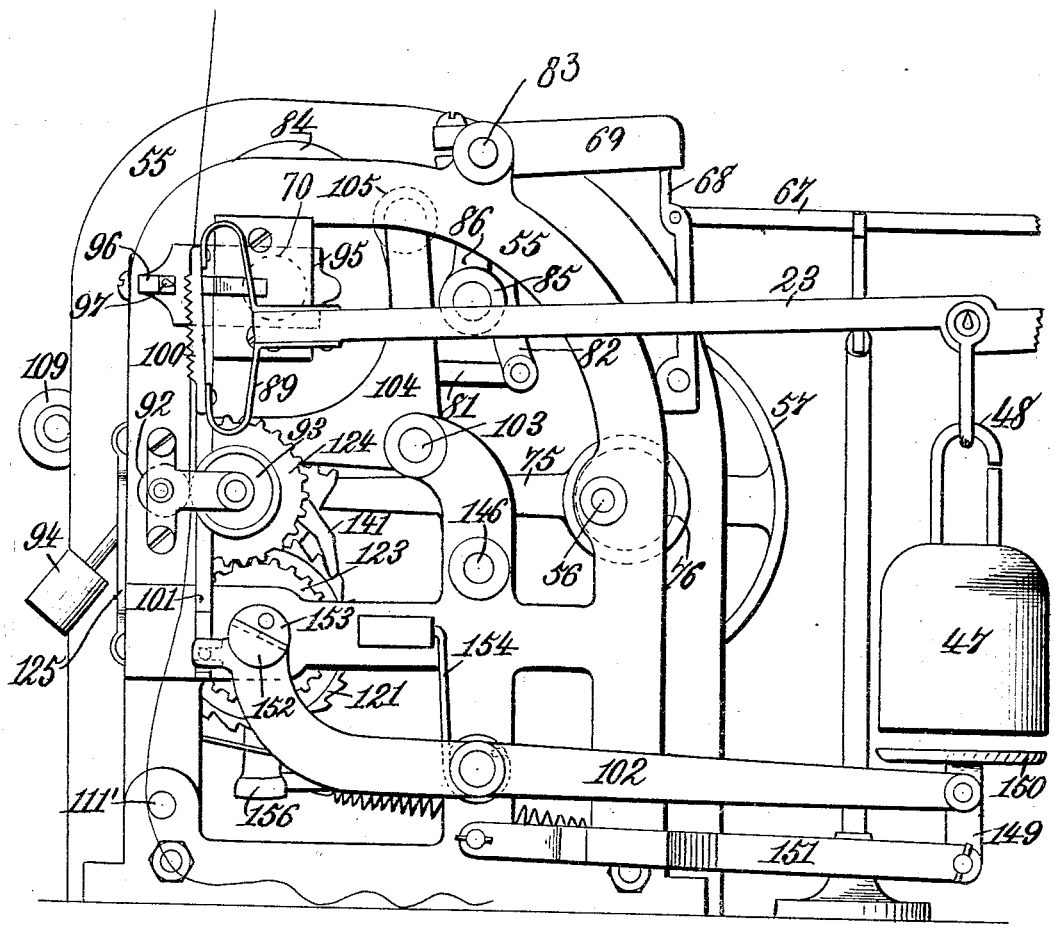

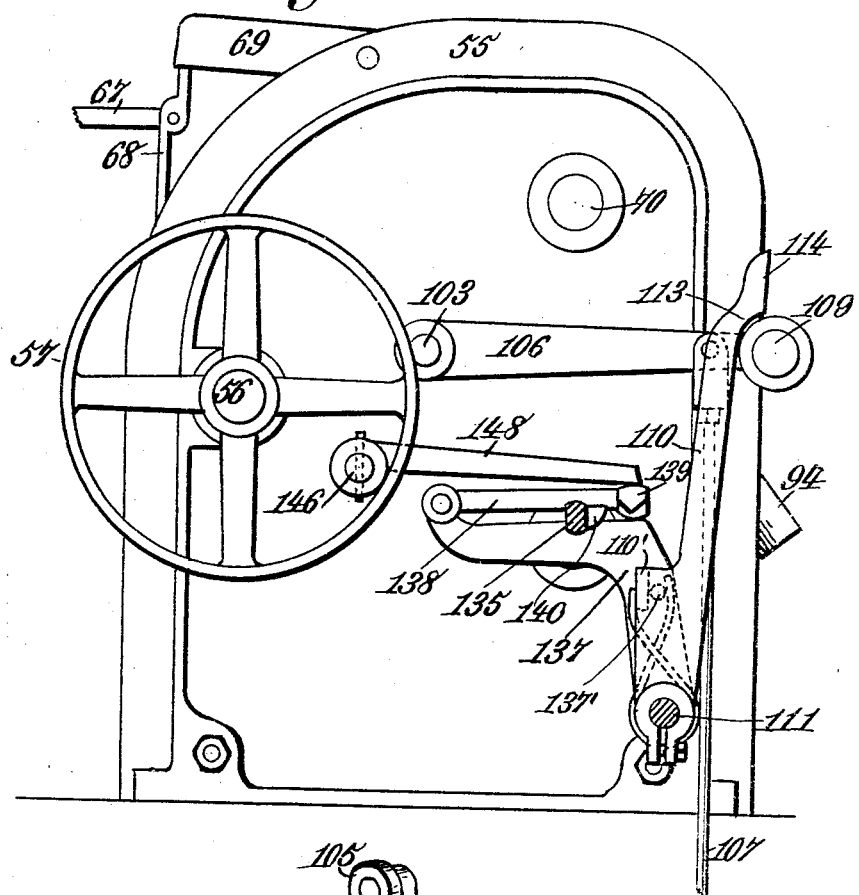
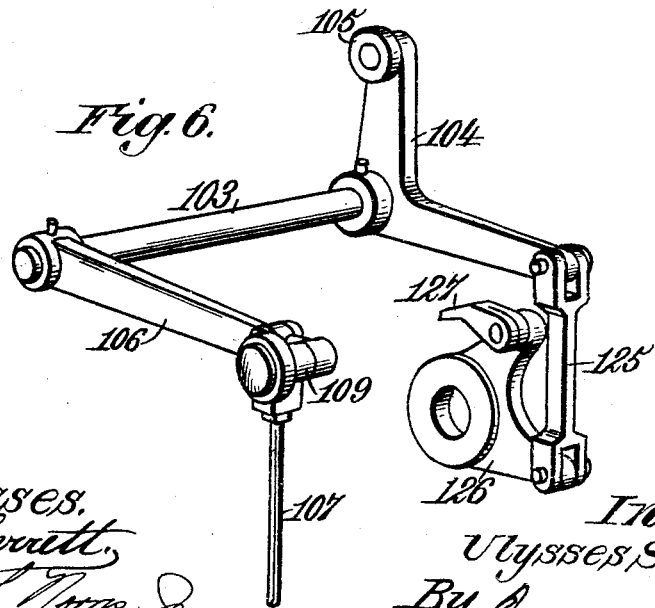

No. 764,530. PATENTED JULY 5, 1904.
U. S. JAMES.
WEIGHING APPARATUS.
APPLICATION FILED NOV. 12, 1903.
NO MODEL. 11 SHEETS—SHEET 6.
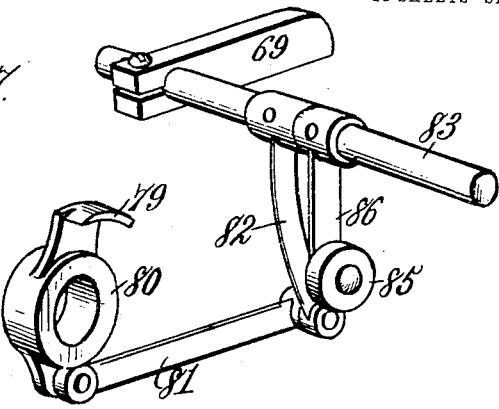
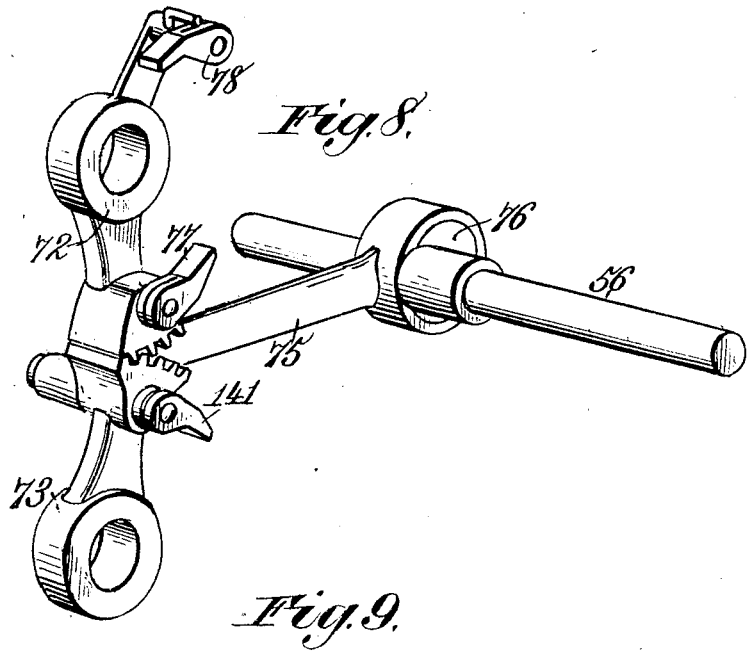
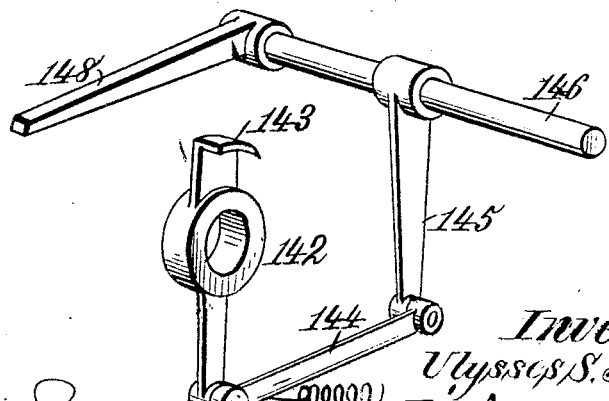
Witnesses.
Robert Everett
James L. Norris
Inventor:
Ulysses S. James,
By James L. Norris
Atty.

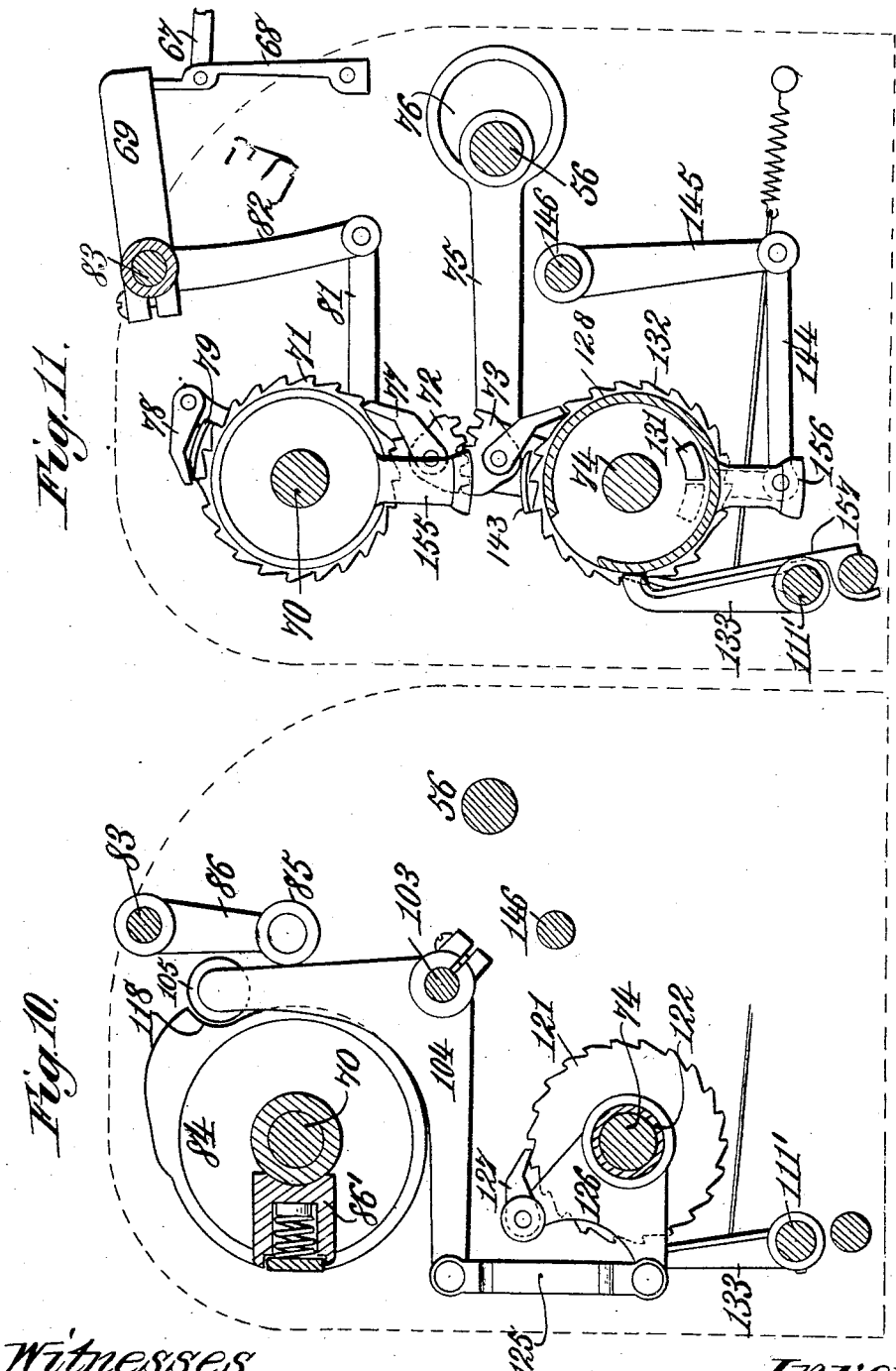

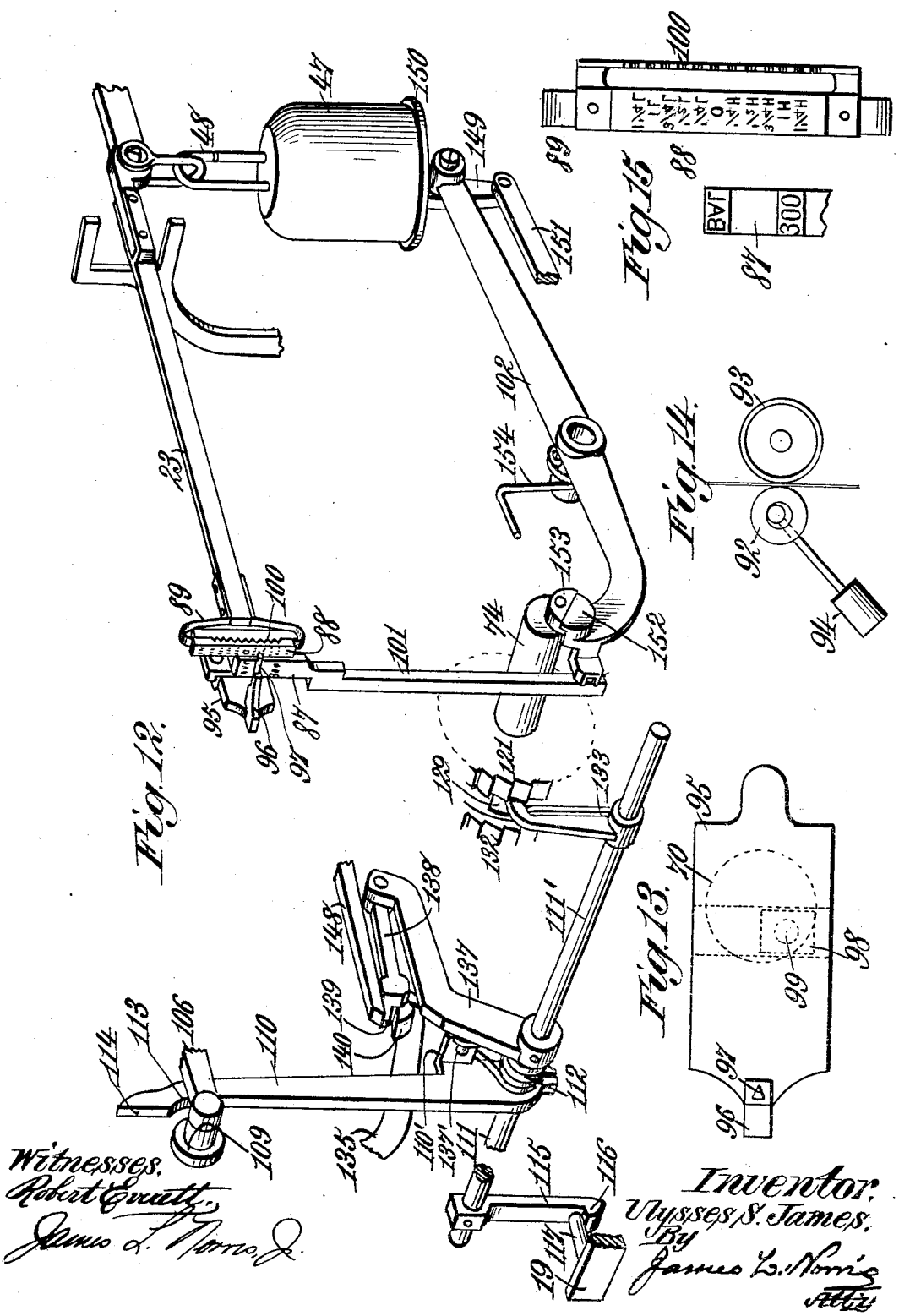

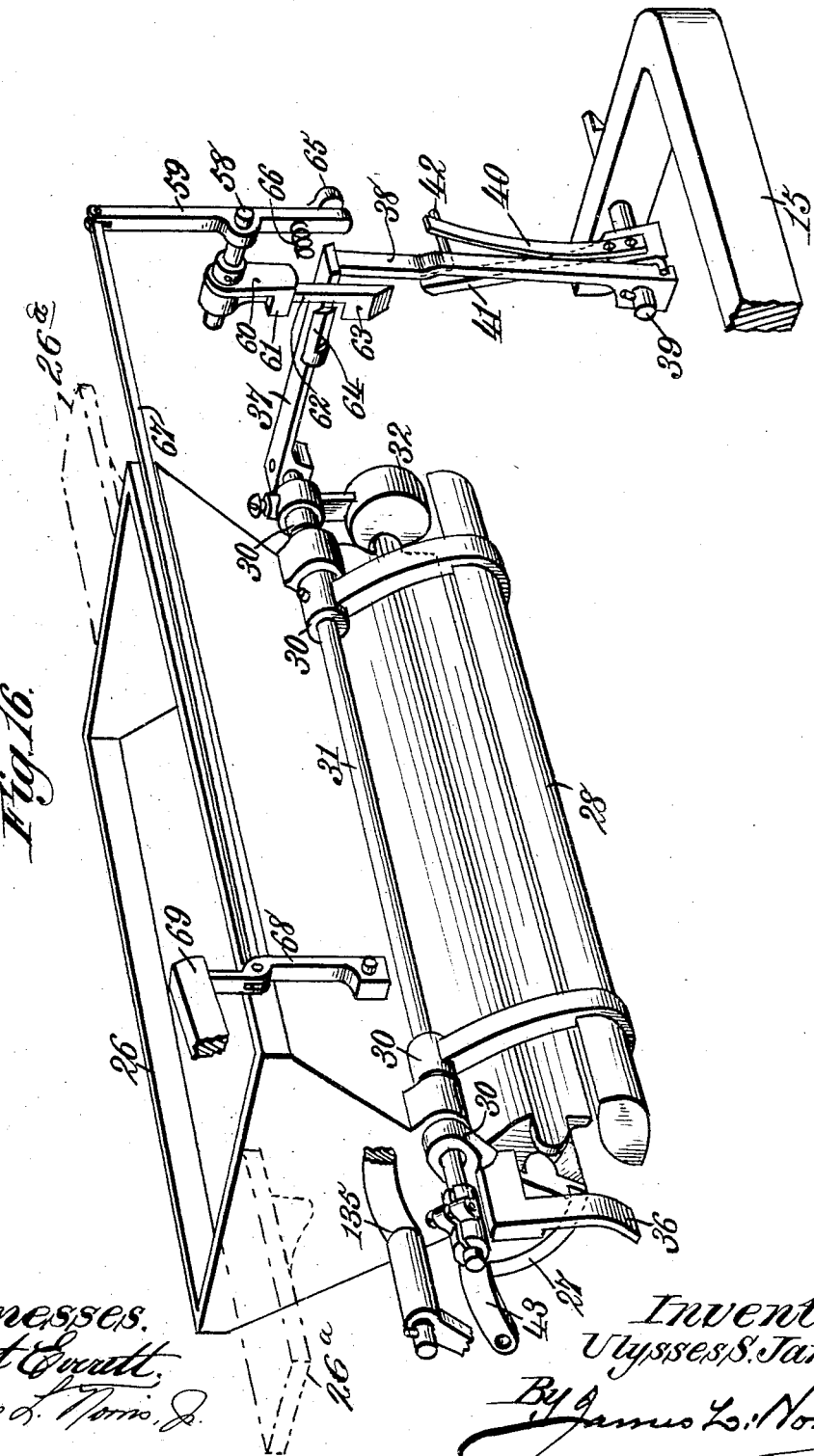

No. 764,530. PATENTED JULY 5, 1904.
U. S. JAMES.
WEIGHING APPARATUS.
APPLICATION FILED NOV. 12, 1903.
NO MODEL. 11 SHEETS—SHEET 10.
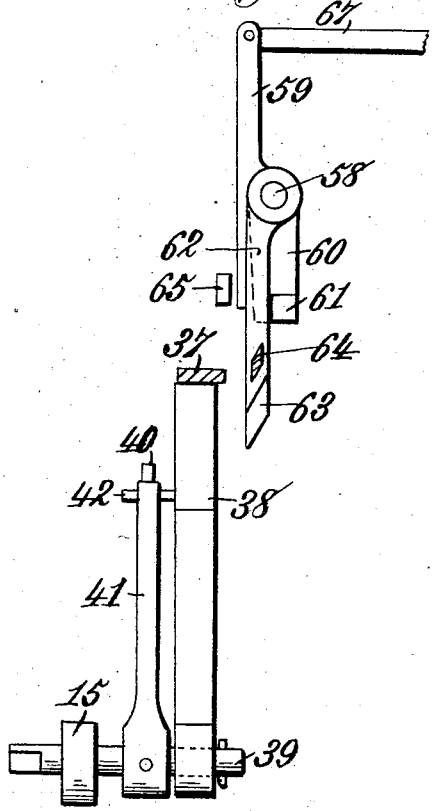
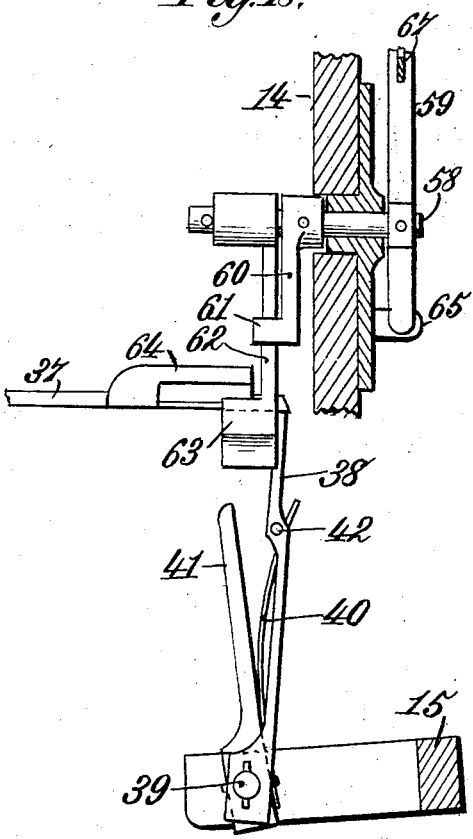
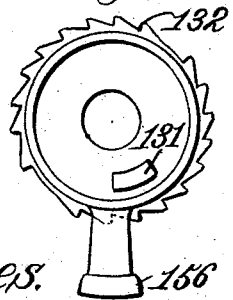
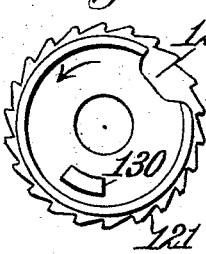
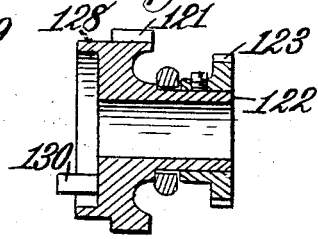
Witnesses.
Inventor,
Ulysses S. James,
By James L. Norris
Atty.

No. 764,530. PATENTED JULY 5, 1904.
U. S. JAMES.
WEIGHING APPARATUS.
APPLICATION FILED NOV. 12, 1903.
NO MODEL.
11 SHEETS—SHEET 11.

Witnesses.
Inventor.
Ulysses S. James
By
Atty.

No. 764,530.

Patented July 5, 1904.

UNITED STATES PATENT OFFICE.

ULYSSES S. JAMES, OF NEW YORK, N. Y., ASSIGNOR TO THE JAMES AUTOMATIC TESTING AND RECORDING SCALE COMPANY, OF NEW YORK, N. Y., A CORPORATION OF DELAWARE.

WEIGHING APPARATUS.

SPECIFICATION forming part of Letters Patent No. 764,530, dated July 5, 1904.

Application filed November 12, 1903. Serial No. 180,896. (No model.)

*To all whom it may concern:*

Be it known that I, ULYSSES S. JAMES, a citizen of the United States, residing at New York city, in the county of New York and State of New York, have invented new and useful Improvements in Weighing Apparatus, of which the following is a specification.

This invention relates to weighing apparatus; and the object of the invention is to provide an effective apparatus of this character organized to rapidly weigh large or small quantities of different kinds of substances, whether of granular or liquid form.

The apparatus in the present case will be described as constructed for weighing and delivering automatically grain, such as wheat.

The work of the machine is as accurate as that of hand-weighing.

In conjunction with the apparatus shown in the accompanying drawings, forming a part of this specification, I employ recording means to record the loads, which is of such character as to indicate either overloads or underloads—that is, either excesses or deficiencies in the several charges—and by virtue of which an absolutely precise and permanent record of the operations of the apparatus can be obtained. The recording means, however, may either in whole or in part be omitted, and the same statement applies to other mechanisms. In fact, said recording, as well as said other mechanisms, may be materially varied as to arrangement, form, and like details without departing from the spirit of my invention included in the claims succeeding the following description.

In some respects the present invention is a modification of that embraced by my contemporaneously-pending application, filed October 10, 1902, Serial No. 126,733, and entitled "Automatic testing and recording mechanism for weighing-machines."

Figure 22:
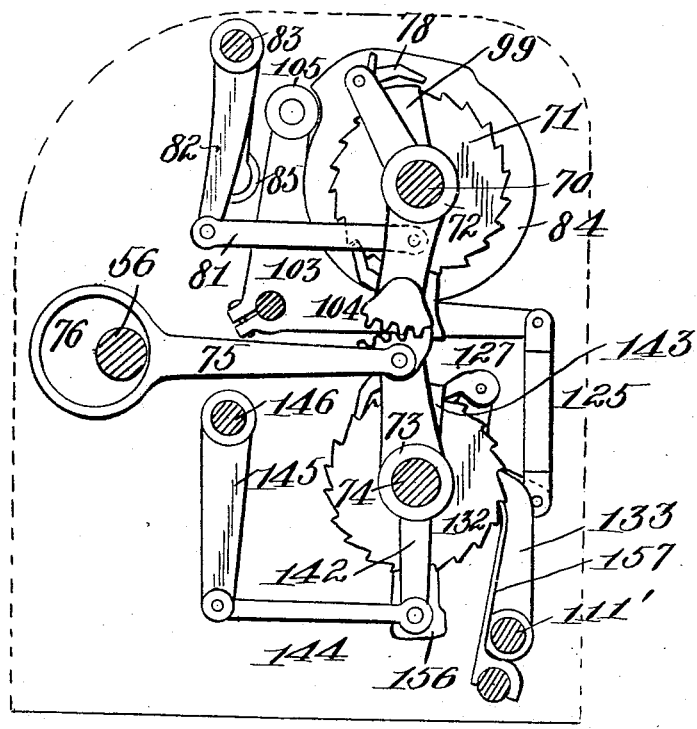

In said drawings, Figure 1 is a sectional front elevation of a weighing apparatus involving my invention. Fig. 2 is a sectional side elevation of the same as seen from the left in Fig. 1. Fig. 3 is an enlarged sectional side elevation of certain actuating and controlling mechanisms. Fig. 4 is a front elevation of the parts represented in Fig. 3 and also showing a portion of a scale-beam. Fig. 5 is a sectional rear elevation of the mechanism for effecting the discharge of a load and certain coöperating parts. Fig. 6 is a perspective view of certain trip, tape-feed, and other parts. Fig. 7 is a view showing a finger controlled by the weighing mechanism and a guard operative with said finger. Fig. 8 is a view of certain feed-pawls and coöperative parts also representing an eccentric for actuating said pawls. Fig. 9 is a view of a guard for a ratchet. Figs. 10 and 11 are sectional front elevations, the sections being taken on the lines 10 10 and 11 11, respectively, of Fig. 3. Fig. 12 is a view of a portion of a beam, a weight-lifter, the load-discharging mechanism, and certain other parts. Fig. 13 is a view of the pressure member and its carrier constituting part of the recording mechanism. Fig. 14 is a view of the tape-feed rolls. Fig. 15 is a face view of the printing mechanism. Fig. 16 is a view of the supply-hopper and valve-controlling mechanism and certain adjacent parts. Figs. 17 and 18 are sectional front and sectional side views, respectively, of certain trip devices and coacting elements. Figs. 19 and 20 are sectional elevations of certain ratchets, and Fig. 21 is a sectional elevation of one of said ratchets. Fig. 22 is a sectional elevation taken on line 22 22 of Fig. 3 looking toward the front of the machine.

Like characters refer to like parts throughout the different views.

I desire at this point to state that I do not limit myself to the disclosure made by the following description, for radical and material variations as to many details of the invention may be made within the scope of my claims. For example, I have shown certain types of weighing, stream-supplying, stream-controlling, and load-discharging mechanisms. Mechanisms, however, of an entirely-different character than those hereinafter described may be employed in certain cases. The same statement applies with equal force to other mechanisms, for in some respects I consider myself to be the pioneer inventor.

The weighing apparatus includes in its construction weighing mechanism which in the embodiment of the invention illustrated in the accompanying drawings includes in its construction a load receiver or carrier and one or more scale-beams. The load-carrier is represented as consisting of a hopper-shaped bucket 2, carried directly by a system of beams each denoted by 3. The beams 3 are supported within a platform 4, which is in the form of a casing inclosing a discharge-hopper 5, into which the loads from the bucket are intermittently discharged. The beams 3 are of course supported by the platform 4, constituting a part of the framework of the apparatus, and they are of the kind ordinarily employed in the so-called "hopper-scales," and hence an extended description of the same is not necessary.

The delivery-opening of the load-receiver or bucket 2 is controlled by a closer 6 of the swinging type, it being pivotally supported in the present instance at the lower forward side of the bucket. This closer constitutes a load-discharging controller and is adapted to be shut by a counterweight 7 upon the forward side thereof. The closer 6, as will hereinafter appear, is positively and automatically released, so as to permit the discharge of the contents of the bucket 2 into the hopper 5, and when the load has completely left said bucket the weight 7 will return the closer 6 to its initial or shut position.

A wheel or disk 8 is represented as mounted for turning movement at the upper rear side of the bucket 2, a rod 9 being pivotally connected with the said wheel 8 and closer 6, respectively. A second rod 10 is connected with said wheel 8 and also with a shorter rod or link 11. The connections between the rods and the parts to which they are united in the present case are pivotal ones. The short rod or link 11 is connected to the forward terminal end of the rod 10 at one end, its opposite end being jointed to the bucket 2 in such manner that normally the several pivots of the rods 10 and 11 will be approximately in line. Therefore it will be obvious that the two connected rods 10 and 11 constitute a toggle for normally maintaining the closer 6 shut. By throwing the toggle center at the extreme right out of horizontal or approximately horizontal line with the other centers the toggle will be broken or flexed, thereby releasing the closer 6, so that the weight of the material sustained upon the same can force it open to thereby permit such material to pass from the bucket 2 into the discharge-hopper.

Upon the upper side of the platform 4 are mounted the standards 12 in vertical parallelism and which sustain at their tops a shelf 13, which in turn carries the casing or housing 14, in which certain of the controlling and actuating parts hereinafter described are inclosed, so as to be protected from the action of dust and other objectionable matter. The casing has upon its forward side a glass door through which the different parts inclosed by said casing can be readily inspected and by opening which ready access may be had to any of said parts for purposes of repair.

The weighing mechanism in the present instance includes what I shall for convenience term "primary" and "secondary" scale-beams, these being in addition to the usual beams which directly sustain the bucket. The primary scale-beam serves certain offices, such as controlling the closing of the valve mechanism which governs the supply of material to the bucket and subsequently the opening of the valve mechanism, while the secondary scale-beam performs the actual weighing or accurate balancing of the material in the bucket. In other words, the primary scale-beam, although provided with a weight, does not serve any function in the balancing of the load, this being secured by the secondary or balancing or weighing beam. In the present instance when the secondary scale-beam is under action for balancing or actually weighing the load the primary beam is out of action.

The primary scale-beam is denoted by 15 and is approximately of yoke form, it being fulcrumed to the rear of its cross-bar upon the standards or uprights 12. Said primary scale-beam has a forwardly-extending arm 16, connected by a linkage connection (denoted in a general way by 17) to what is shown in Fig. 1 as the left end of the shelf-lever 18. By virtue of said linkage connection, the links being open or loop ones, the said shelf-lever may have a relative movement with respect to the primary beam. Said primary beam has a rearwardly-extending arm 19, from which is suspended a weight 20, which is of a mass sufficient to slightly underbalance the predetermined load. The mass of the weight, however, is sufficient to effect the opening of the valve mechanism hereinafter described.

The shelf-lever 18 is connected loosely by a rod 21 to the uppermost one of the platform-beams 3, the connection between the rod 21 and the shelf-lever being substantially midway of the latter. What is represented as the right end of the shelf-lever is connected by a rod 22 with the short arm of the balancing or weighing beam 23, fulcrumed upon the pillar or post 24, supported by the shelf 13 within the casing 14. Therefore when the bucket settles the weighted ends of the primary and secondary beams through the connections with the platform-beams will be elevated in unison for a certain period.

It will be remembered that the primary beam 15 is thrown out of action, and this occurs just before the completed load is in the bucket or at about the time the so-called "drip-stream" has been cut off. The rear end of the primary beam 15 plays between the branches of a trig-loop 25, the lower branch serving when the apparatus is at rest as a support for the weighted end of said primary beam, while the upper branch of the trig-loop is engaged by the weighted end of the primary beam just before the load is made up in the bucket. Therefore the trig-loop, or rather the upper branch thereof, constitutes a means for putting the primary beam out of action. Beyond this point the secondary or balancing beam 23 is effective, so as to accurately weigh the load in the bucket.

It will be seen that the connections between the various beams are loose ones, by reason of which the secondary scale-beam is permitted to have a free motion to weigh or balance a load after the primary beam is out of action.

The stream-supplying means is illustrated as consisting of a hopper 26, having the lateral arms $26^a$ connected in any desirable way with the standards 12 and located in such relation to the bucket 2 that the stream of material issuing therefrom will gravitate into said bucket. The stream-controlling means is represented as consisting of two valves—a main valve 27 and an auxiliary valve 28—these being arranged to have their effective portions swing under the outlet or mouth of the hopper 6 to arrest the supply-stream. The two valves are suitably mounted upon the hopper for swinging movement upon an axis in common. Each valve is provided at the upper end thereof with sleeves each denoted by 30, the sleeves of the main valve being loose upon the transverse rock-shaft 31, (see Fig. 16,) carried by suitable brackets upon the forward side of the supply-hopper 26. The closing of the main valve is assisted by a weight 32, carried upon an arm the hub of which is suitably connected to said main valve. The sleeves 30 of the auxiliary valve are fastened to said rock-shaft.

Upon the primary scale-beam 15, slightly to the rear of its center of motion, is adjustably mounted an arm 33, (see Fig. 2,) extending normally diagonally upward and rearward from said beam and having between its ends a segmental downward and rearward extension 34, connected by a pin and arcuate slot-joint (denoted in a general way by 35) with said primary beam, by means of which joint the angular position of the arm 33 can be adjusted. This arm 33 controls the closing of the main valve during the loading of the bucket, and subsequently, when the bucket is rising empty with its closer shut, serves to open the said main valve. Said main valve 27 is provided at one end with a cam 36, (see Figs. 2 and 16,) with the working surface of which the free end of the arm 33 coacts. The two valves being wide open, as shown in Fig. 2, and the closer 6 being shut, the full volume of the supply-stream from the hopper 26 will flow into the empty bucket 2, and when a certain proportion of the load is therein the bucket, with its contents, will settle, whereby the weighted arm of the primary beam 19 will be caused to rise, and as it does so the free end of the arm 33 will move away from the cam 36, the working surface of the latter during such motion rolling upon said free end, by virtue of which the main valve is permitted to close by its own weight, augmented by the effect of the weight 32, and at about the time the major portion of the load is in the bucket the arm 33 will have passed entirely free of the cam 36, the main valve 27 at this point being closed and naturally cutting off the greater portion of the stream from the hopper 26. At this stage an attenuated or, as is known in the art, a "drip" stream flows through the reduced outlet of the hopper 26 into the bucket to complete or top off the load therein, and just about the time the load is completed the auxiliary or drip valve 28 will be permitted to close by its weight, so as to cut off the stream. At the time the auxiliary valve is closed the weighted end of the primary beam 15 will have struck the upper branch of the trig-loop 25. Therefore the primary beam 19 is out of action; but the secondary or balance beam remains in action to weigh the mass that was in the bucket at the time the auxiliary valve was closed and also that material that was in the air between the material in the bucket and the supply hopper, which material subsequently falls onto the mass in the bucket.

I have described the action that takes place on the closing of the main valve. I will now set forth that which follows on the closing of the auxiliary one.

To what is shown in Fig. 16 as the right end of the rock-shaft 31 is fastened the arm 37, which when the auxiliary or drip valve 28 is wide open is engaged under its forward end by the yieldable latch 38, loosely mounted at its lower end upon the pivot or stud 39, extending inward from the primary beam 15 at a point coincident with the fulcrum thereof. This latch 38 is normally held in operative position by means of the spring 40, fastened at one end to the hub of the trip device 41 and bearing at its free end against the pin 42, extending laterally from the pivotally-mounted latch 38. The hub of the trip device, which, it will be seen, consists of an arm, is rigidly fastened to the stud 39. At a point immediately preceding the completion of the predetermined load in the bucket 2 the free end of the trip device 41, which, it will be understood, swings with the primary beam 15, strikes the pin 42 on the latch 38, thereby disengaging the latch from the arm 37. The consequence will be that the auxiliary or drip valve 28 is released and will be instantly closed. The motion that follows on the tripping of the latch 38 is a slight one and it occurs at an instant before the weighted end of the primary beam 15 strikes the upper branch of the trig-loop 25.

After a load has been discharged and at a properly-controlled point, as will hereinafter appear, the weighted end of the beam 15 drops, and as it does so the arm 33 is swung rearward, said arm on such motion engaging and virtually rolling upon the working face of the cam 36, so as to open the main valve 27.

To what is shown in Fig. 16 as the left end of the rock-shaft 31 is fastened an arm 43, from which the link 44 pivotally depends, the link (see Fig. 2) having at its lower end an elongated loop 45 to receive the projection or pin 46 upon the weighted arm of the primary beam. As the bucket is being lowered, the pin 46 will of course rise and leave the lower end of the loop 45. When, however, the auxiliary valve 28 is closed in the manner hereinbefore described, the link 44, by virtue of its connection with said auxiliary valve, will be lifted so as to carry the lower end of the loop against said pin 46. When, therefore, the weighted arm of the primary beam lowers, it serves through the pin 46 to pull the link 44 downward and through the arm 43 and shaft 31 to swing the auxiliary valve 28 wide open. As the auxiliary valve is opened the arm 37, which moves therewith, will ride against the rear face of the latch 38, and the moment that said auxiliary valve is wide open the latch 38, by the action of the spring 40, will be snapped under the arm 37, so as to hold the auxiliary valve open until the latch is again tripped by the action of the primary beam.

The secondary or weighing beam 23, which performs the actual work of balancing the load in the bucket and with which, as will hereinafter appear, operates a recording device, has suspended from what is shown in Fig. 1 (see also Fig. 12) as its left arm the weight 47, which constitutes one form of load-counterbalance, the connection between the weight 47 and the beam 23 being a loose one and shown in the present instance as connected loops each denoted by 48, by virtue of which said weight can have a movement relative to the beam 23. This movement, as will hereinafter appear, occurs when a test is being made of the condition of the scale, which test is indicated upon a tape which receives the record. Therefore it will be obvious that the load-counterbalance is thrown out of operative relation with the weighing mechanism, and, as will be hereinafter set forth, this operation occurs at intervals and when the load-receiver or bucket 2 does not carry a load. The beam 23 also carries the usual sliding weight 49, serving its customary purpose.

Plungers 50 are suspended from the scale-beam 23 (see Fig. 1) at opposite sides of its center of motion, and the lower portions of these plungers are immersed in liquid contained in the vessels 51, connected at their lower ends by the pipe 52, by reason of which the liquid can flow from one vessel to another, and vice versa. A gage-glass 53 is connected with the pipe 52 at a convenient point in its length and serves to indicate the height of the liquid in the communicating vessels, which, it will be seen, are supported by the shelf 13. The plungers are freely fitted in the vessels, and they are represented as being of approximately inverted-cup form, the bodies thereof being substantially cylindrical. The area of the lower edges of the plungers is known, whereby each plunger will force from its coöperating vessel a definite quantity of liquid. When the beam 23 is at a true poise or balance, it will occupy a horizontal position, the plungers 50, which with their coöperating parts are in the nature of supplemental poising means, being exactly counterbalanced. Should there be an excess of weight applied to the poising side of the beam, or that part to the right of its center of motion, said poising side will be drawn below the horizontal line, the counterpoising side of the beam being lifted above said line a corresponding distance, and the result, therefore, is that the plunger on the right is forced down deeper into the liquid, the other plunger being lifted a like extent. As the plunger on the right sinks into the liquid it meets gradually an increased resistance, while when the plunger on the left is rising it virtually increases in efficiency to an extent proportionate to the body of liquid displaced by the plunger on the right, thereby automatically counterbalancing an excess in weight put upon the poising side of the beam. The liquid displaced by the plunger on the right flows from the corresponding vessel into the other vessel, or the one at the left, by way of the connecting pipe or tube 52 and flows into the space left by the plunger on the left as it rises. Should the weight applied to the poising side of the beam be under the normal, just the opposite result will take place, so as to indicate light weight, and in the latter event the plunger on the left is dipped farther into the liquid contained in its vessel to displace the same, while the movement of the plunger on the right is virtually increased. Therefore the supplemental poising means acts to counterbalance an excess in load or to equalize a deficiency in the load, and such excess or deficiency, as will hereinafter appear, is recorded, the beam directly carrying a printing member to indicate either the excess or deficiency. Each plunger has a perforation 54, so that it serves as a dash-pot, and thereby avoids vibration of the secondary or weighing beam.

The liquid contained in the communicating vessels 51 may be of any suitable kind. In practice I have found a mixture of common petroleum and refrigerator-plant oil a satisfactory liquid.

As hereinbefore stated, the machine involves recording mechanism, and a record of the loads is taken, as well as any variation in the same, either by way of deficiency in weight or excess in weight, and the recording mechanism in the present instance is operated by power, which power is also utilized after a record has been obtained to effect the discharge of a load.

In the casing 14 and mounted upon the shelf 13 is a supplemental framing 55, which carries certain recording, controlling, and other devices, as well as the power-shaft 56, which in the present instance is continuously rotative, said shaft extending through the rear of the casing and being provided outside the casing with a power-driven member, which is shown consisting of a pulley 57, which may be actuated by any suitable form of motor, transferring its force through belting. Neither motor nor belting is represented.

The power-driven member, as will hereinafter appear, is thrown into working relation with the recording means by mechanism under the control of the weighing mechanism, the parts being so organized in the present case that after the load is completed the recording means will be rendered effective.

Extending through what is shown in Fig. 1 as the right end and rear portion of the casing 14 is a stub-shaft 58, which fixedly carries at its inner end the rocker 59, the rocker being united to the stub-shaft between its ends. To that part of the stub-shaft 58 which projects outside the casing (see Fig. 16) is rigidly fastened the depending member 60, having at its lower end the offset 61, which coöperates with the swinging member 62, depending from the stub-shaft. The foot 63 of the swinging member 62 is provided with oppositely-beveled faces coacting with the trip 64 upon the arm 37, which, it will be remembered, is connected with the auxiliary or drip valve 28. When the auxiliary or drip valve is being closed, the trip 64 will swing down, and as it does so its beveled face will ride against the outer beveled face of the foot 63, thereby swinging the member 62 inward and pressing the same against the offset 61, whereby the member or arm 60 is swung in a corresponding direction to rock the shaft 58 and swing the upper arm of the rocker 59 to what is shown in Figs. 1 and 16 as the right. As the rocker thus swings its lower arm is moved away from the stop 65, in which position it is normally held by the coiled push-spring 66. The motion of the rocker 58, brought about by the action of the trip 64, is utilized to effect the release of a latch hereinafter described. The instant that the said latch is tripped the spring 66 tends to return the rocker 59 to its initial position, with the lower arm of the rocker abutting against the stop 65. As the auxiliary valve 28 is opened the arm 37 will of course be swung upward, and the trip 64 on such motion will engage the inner beveled face of the foot 63 of the swinging member 62, the latter during such operation moving away from the offset 61. As soon as the trip 64 passes free of the foot 63 on the opening of the valve the member 62 automatically or by its own weight resumes its initial position in contact with the offset or projection 61.

To the upper arm of the rocker 59 is connected one end of a rod 67, the other end of the rod being connected to a latch 68, (see Figs. 11 and 16,) which normally engages under the gravitative finger 69 to uphold said finger. The latch 68 is pivotally mounted upon a stud on the auxiliary framing 55. When the rocker 59 is operated through the agency of the trip 64 in the manner hereinbefore described, the rod 67 is drawn to the right, thereby pulling the latch 68 from under the gravitative finger 69, whereby the latter can drop to secure certain results hereinafter set forth.

The auxiliary frame just mentioned carries a shaft 70, (see Fig. 11,) to which a ratchet 71 is fastened, the ratchet being of the mutilated type and being shown as having one tooth omitted, the purpose of which will be set forth hereinafter. Loosely carried by said shaft is a rocker 72, having segmental teeth at its lower edge adapted to mesh with similar teeth on the rocker 73, loose on the shaft 74, situated below the shaft 70 and also carried by the auxiliary frame 55. The rocker 73 is pivotally connected to the rod or pitman 75, operated by the eccentric 76 on the main or power shaft 56. It will be understood that the rod 75 is given a continuously-reciprocatory motion as long as the power-driven member or pulley 57 is being rotated. The result, therefore, will be that the rocker 73 and hence the coöperating rocker 72 are oscillated. The rocker 72 pivotally carries at superposed points pawls 77 and 78, which work oppositely. Normally the pawl 77 plays in the cut-out space of the ratchet 71. Normally, also, the pawl 78 works against a guard 79, which is shown as an outwardly-disposed slightly-curved flange at the upper end of the rocker 80, which rocker is oscillatory upon the shaft 70. The rocker 80, it will therefore be apparent, has a free movement upon the shaft 70 and carries a guard which is normally effective for maintaining one of the ratchet-operating pawls out of action. The pawl 78 as it is vibrated of course rides along the upper surface of the guard or flange 79 without rotating the ratchet 71, while at the same time the pawl 77 works back and forth in the cut-out space of said ratchet. The guard 79 is upon the upper arm of the rocker 80, while to the lower arm thereof is pivoted one end of the link 81, the opposite end of the link being connected to the lower end of an arm 82, fixedly secured to and depending from the rock-shaft 83, which fixedly carries the finger 69, constituting an operating member.

Upon the completion of a load in the bucket, as hereinbefore described, the latch 68 is tripped, thereby freeing the gravitative finger 69, so that the same can drop, and as said finger drops the shaft 83 is rocked, thereby swinging the arm 82 toward what is shown as the left in Fig. 11, and consequently moving the guard or flange 79 to the right, whereby the pawl 78 can drop into engagement with the teeth of the ratchet 71. As the rocker 72, which carries said pawl, is constantly in motion, the pawl as soon as it is released by the guard will ratchet the wheel 71 around. When the pawl 78 encounters the cut-out space of the ratchet 71, it becomes for the instant ineffective; but the pawl 77 during such instant is effective for rotating the ratchet 71, and such rotation of the ratchet will continue until it has made one complete turn or until the cut-out space thereof is brought opposite the point of the pawl 77. As the finger 69 is of the gravitative type, it must be positively returned to its initial position, or that shown in Fig. 11, whereby the latch 69 can engage under the same, and this function is obtained by the ratchet 77. The pawl 78 imparts practically a complete rotation to the ratchet 71, while the pawl 77 imparts the remainder of the motion to said ratchet. When the ratchet has nearly made a full turn, the effective portion of a cam 84, rigidly connected with the shaft 70, will engage a projection or roller 85 at the lower end of the arm 86, rigidly secured to and depending from the rock-shaft 83. The said cam, or rather the working portion thereof, engages the roller 85 just before the ratchet 71 has made a complete turn. The result will be that the arm 86 is swung toward the right in Fig. 10, thereby swinging the arm 82 in a corresponding direction and actuating the rocker 80 to again move the guard 79 into the path of the pawl 78. After the guard 79 has been returned to its pawl-holding position (shown in Fig. 11 by the cam 84) the ratchet 71 is of course operated, but by the pawl 77 or until the cut-out space of the ratchet comes opposite said last-mentioned pawl, as hereinbefore set forth, when the ratchet will be at rest.

The cam 84 is of the snail type and is rigidly connected to the shaft 70, and said cam, as will hereinafter appear, performs another office, and to prevent overthrow of the same a spring-actuated friction-brake 86' operates in connection with the hub of said cam. It should be stated that the cam 84 and ratchet 71 are fast to their supporting-shaft in order to secure their movement in unison.

In the present case a record is taken of a load after the same is weighed. The recording means is thrown into action by the gravitative finger 69, when the latter is released, as hereinbefore described.

The recording means, as will hereinafter appear, includes a main printing member, as 87, it being shown as a block bearing upon its face the figures "300," above which is the abbreviation "Bal." for the word "balance." Normally the character "300" is at the printing-point, so that an impression can be taken from the same. At intervals, as will hereinafter appear, the printing member is shifted, in the present instance in a downward direction, so as to bring the abbreviation "Bal." at the printing-point. This shifting of the printing member occurs during the testing operation. The recording means also includes an auxiliary printing member, as 88, consisting of a plate fastened at its upper and lower ends to the free portions of a bowed spring 89, carried at the extended left end (see Fig. 4) of the secondary scale-beam 23. If an absolutely accurate load, or, as in the present case three hundred pounds of material is in the bucket, the character "0" shown as located at the center of the auxiliary printing member 88, is brought to the printing-point and in horizontal line with the character indicating the weight of the load. Above and below the said "0" mark are certain fractional and unit marks to indicate either an excess or deficiency in the load, the said marks being followed by the letters "L" or "H," as the case may be—that is, to show that the machine is light or heavy in its work. The main printing member 87 is normally at rest, it being supported independently of the weighing mechanism, as the normal loads are of a known standard; but this does not apply either to deficiencies or excesses in weight, which are indicated by the auxiliary printing member.

The top of the casing 14 supports a boxing 90, into which a tape or ribbon, of paper or suitable material, in spool or roll form 91 is placed. (See Figs. 1 and 2 for example.) The leading end of the tape is drawn downward from the spool or roll and passed between the rolls 92 and 93, arranged side by side below the printing member, the roll 93 constituting a feed-roll, and its periphery being milled or roughened to facilitate the feed of the tape, while the roll 92 constitutes a pressure-roll. Said roll 92 is eccentrically mounted and is provided with a weight 94 (see Fig. 14) to bite against the tape between the two rolls. The roll 93, as will hereinafter appear, is fed step by step, it being given a step movement after each load is recorded and being given an increased movement after a record of a test has been taken, as will be hereinafter set forth. The tape from the roll of paper passes in proximity to the main and auxiliary printing members 87 and 88, it being positively pressed against said printing members, as will hereinafter appear, so that an impression will be had on the tape from the type on the printing members. In the present case the type cut into the paper, and thereby a permanent and satisfactory record is secured.

Upon the outer side of the auxiliary frame 55 is mounted for horizontal sliding movement a block or plate 95, (see Figs. 12 and 13,) provided at what is shown as the left end thereof with a pressure member 96 in the form of a projection on the block, said pressure member having a knife-edge portion 97, the purpose of which will hereinafter appear. The inner side of the horizontally - reciprocative block 95 is slotted to receive a vertically-reciprocative slide 98, perforated to receive the crank-pin 99 on the outer end of the shaft 70, which shaft, it will be remembered, is given after each load is weighed one turn. The two blocks 95 and 98 are shown as occupying their normal positions in Fig. 13. When the shaft 70 is given its rotation in the manner hereinbefore described, the pin 99 is revolved, so as to impart one full stroke to the block 95 through the agency of the intermediate block 98, carried thereby. On the advance movement of the block 95, or as it travels toward the right in Fig. 13, the pressure member 96 thereon presses the tape or ribbon of paper against the type of the two printing members.

One of the first things that occurs after the arrest of the supply-stream from the bucket 2 is the release of the finger 69, which, it will be remembered, controls the action of the recording mechanism. After said finger 69 has dropped and while the pressure member 96 is being advanced toward the two printing members the secondary scale-beam 23 is balancing the load in the bucket 2, and just before the said scale-beam 23 comes to rest the pressure member 96 will be adjacent the two printing members. On the completion of the advancing movement of the said pressure member the printed record of the load, as well as any variation in the same, will be secured.

To prevent oscillation of the beam 23 while a record is being taken, the knife-edge 97 is provided, it entering the space between the teeth or serrations of a toothed flange 100 on the auxiliary printing member. As soon as the impression is taken from the two printing members the pressure member 96 of course backs away from the same, the motion continuing until said pressure member 96 has resumed its normal position, or that shown in Fig. 13, the two pawls 77 and 78 at this time being in the position shown in Fig. 11, and the finger 69, which controls said pawls, being upheld by the latch 68, and said latch 68 will uphold said finger until it is tripped or released upon the completion of a second load.

The main printing member 87 is formed at the upper end of a bar or shank 101, pivotally connected at its lower end with a lever 102, supported by the auxiliary frame 55 and constituting a lifter for the load-counterweight 47. The purpose of the lever 102, as well as the reason for its connection with the main printing member 87, will be hereinafter set forth.

The auxiliary frame 55 carries a rock-shaft 103, to the forward end of which is suitably fixed an angle-lever 104, the vertical arm of which is provided with a projection or antifriction-roll 105, coöperative with the cam 84, hereinbefore described. (See Figs. 6 and 10.) The angle-lever 104 is carried at one end of the shaft 103, while the arm 106 is carried at the opposite end of said shaft, the said arm 106 being outside the casing 14. This arm 106 is provided with a depending rod 107, constituting a breaking or flexing device for the closer-locking toggle hereinbefore described, which toggle, it will be remembered, consists of the connected rods 10 and 11. (See Fig. 2.) This rod 107 carries at its lower end a yoke-shaped part 108. Just about the time the pressure member of the recording mechanism has resumed its initial or backward position, or that shown in Fig. 13, the working portion of the cam 84 will engage the antifriction-roll 105, so as to swing the approximately vertical arm of the angle-lever 104 to what is shown in Fig. 10 as the right. The shaft 103 will therefore be rocked thereby through the intermediate arm 106, lifting the rod 107 and carrying the toggle-breaking device 108 forcibly against the toggle, whereby the latter is flexed. As soon as said toggle is flexed the closer 6 is released and will be forced open by the weight of the material sustained thereupon.

As soon as the material commences to discharge from the bucket said bucket is lightened, and the tendency, therefore, of the weighted end of the primary beam 15 is to drop. I provide means for positively locking said beam against return movement the instant the load is discharged, and this result is brought about primarily by the cam 84. When said cam 84 rotates, it will be remembered that the shaft 103 is rocked to effect the discharge of the load from the bucket. The arm 106, to which the load-discharging means is connected, is provided with a projection 109, (see Figs. 5 and 6,) which normally is seated in a slight depression or recess near the upper end of the approximately vertically-disposed arm 110, rising from and rigidly united to the rock-shaft 111, which rock-shaft is suitably supported by the framework of the machine. The relation just set forth is maintained by a coiled spring 112, surrounding the said rock-shaft and the terminal coils of which bear against a stop on a relatively fixed part and also against an offset on the arm 110 in proximity to said shaft.

Above the depression 113 in the arm 110, in which depression the antifriction-roll 109 normally lies, is a straight face 114. As soon as the roll leaves the depression on the elevation of the arm 106 it rides against the straight face, so as to swing the arm 110 to what is shown in Fig. 5 as the left.

From the extreme outer end of the shaft 111 depends the arm 115, constituting a locking device for the primary beam 15, the working lower portion of the arm being shown as a lateral shoulder 116, coöperative with a pin or projection 117 extending inward from the rear and weighted arm of said primary beam. Normally the shoulder 116 is out of the path of the projection 117, so as to freely permit the making up of a load in the bucket 2. As soon, however, as the load is discharged in the manner hereinbefore set forth the rock-shaft 111, through the primary intervention of the cam 84, is rocked, and as it rocks the arm 115 is swung in a direction to carry the shoulder or effective portion 116 thereof under the pin 117 on the weighted side of the said primary beam 15, thereby preventing the descent of said weighted side of the beam. The opening of the closer 6 occurs at this time, and as soon as the closer is opened the shaft 111 is returned to its initial position, as will now appear, to carry the shoulder 116 from under the pin 117, thereby releasing the primary beam so far as the locking element 115 is concerned. However, when the beam is released by said locking element 115 a second locking element comes into play for locking the beam while the closer is open, and the beam 15 is locked against return movement until the closer is practically shut.

As soon as the working portion of the cam 84 passes off the roll 105 said roll 105 will be snapped into the notch 118 in the periphery of the said cam. This snapping of the roll into said notch is brought about by the spring 112, which up to this point was under compression. The spring of course initially acts against the arm 110 and through the latter acts on the angle-lever 104 by virtue of the intermediate connections. The arm 106, under the action of the spring 112, will be lowered, and the arm 110, also under said spring action, will be swung to the right in Fig. 5. As said arm 110 swings in such last-mentioned direction the shaft 111, carrying it, is rocked, so as to carry the shoulder 116 from under the pin 117.

Upon the counterweighted side of the primary beam 15 is a curved finger 119. The stub-shaft on the bucket 2, which carries the disk or wheel 8, is of semicircular form, as shown at 120, at its outer end. This construction of the terminal outer portion of the stub-shaft produces a flattened face. As the counterweighted side of the beam 15 rises on the supply of material into the bucket 2 the finger 119 will of course be elevated therewith and the free portion will be carried in proximity to the flattened face of the portion 120 of the shaft of the wheel 8. When the closer 6 is released and opened, as hereinbefore specified, the wheel 8, and hence its shaft, to which it is fastened, will be rotated, and as the said parts rotate the flattened portion of the semispherical end 120 of the wheel-shaft will be brought to a horizontal position and under the finger 119, whereby the weighted side of the beam 15 is locked against descent. This locking of the finger by the shaft takes place the instant the closer opens and is a rapid one, whereby the moment the beam is released by the locking element 115 a second locking means will be effective to hold the beam against return. When the closer 6 shuts after a load of material has fully passed clear of the same, the locking portion 120 is carried from under the finger 119, thereby releasing the primary beam, so that it can be returned to its initial position by the falling of the weight 47.

The tape or ribbon upon which impressions are taken from the printing mechanism should be given a step-by-step motion—that is, the said ribbon must be fed one step after a record has been taken of each load. A means for accomplishing this result will now be set forth.

Upon the shaft 74 is loosely mounted the ratchet 121, (see Figs. 10, 11, 20, and 21,) having an elongated hub 122, to which is fastened the gear-wheel 123, meshing with a companion gear-wheel 124, rigid on the shaft which carries the roll 93.

From the outer end of the horizontally-disposed arm of the angle-lever 104 depends the link 125, united at its lower end to one arm of an angle-lever 126, (see Fig. 6,) loose on the shaft 74. (See Fig. 10.) The other arm of the angle-lever 126 carries a pawl 127, coöperative with the teeth of the ratchet 121. Each time that the cam 84 operates the angle-lever 104 in the manner hereinbefore set forth the link 125 is lifted from the position shown in Fig. 6, so as to thrust the pawl 127 to the left, the pawl thereby operating the ratchet 121 a distance of one tooth. The gear 123 is also rotated a corresponding distance and rotates the companion gear 124, thereby rotating the feed-roll 93 and imparting a step to the tape or ribbon which receives the impressions. It should be understood that the operation of the pawl 127 takes place after a record of a load has been made, the parts being so timed as to bring about this result. In fact, the operation of the pawl 127 occurs when the pressure member 96 has nearly resumed its initial position.

I have described at length the construction and operation of the machine organized for weighing and delivering automatically loads of material and securing a record of the loads. At intervals I automatically test the condition or balance of the scale and secure a record of the test. In making the test it is necessary to throw the load-counterbalance out of operative relation with the weighing mechanism, the load-receiver or other carrier for the latter being at this time free of a load. The testing of the machine may take place at desirable intervals—say after the weighing and discharge of twenty loads.

During the testing operation the main printing mechanism 87 is so shifted as to carry the character indicating the load away from the printing-point and to bring another character to such printing-point, this shifting of the printing member being secured in the present instance by virtue of its connection with the lever 102, which, as will be remembered, constitutes a lifter for the load-counterbalance 47.

The ratchet 121 is loose on the shaft 74, and, as previously stated, it is fed a distance of one tooth after a record of each load has been taken. This record has on what is shown as its inner side a flange 128, shown as annular and as having the let-off or releasing notch 129. (See, for example, Figs. 11 and 21.) The inner side of the said ratchet 121 also has a projection 130 coöperative with a substantially similar projection 131 on the adjacent ratchet 132, said ratchet 132 being shown as mutilated, it having two of its teeth removed or cut out for a purpose that will hereinafter appear. The ratchet 132 is fast on the shaft 74. In Fig. 20 I have indicated by an arrow the direction of rotation of the ratchet 121. After the ratchet 121 has been rotated a distance of twenty teeth, or after twenty loads have been weighed, recorded, and discharged, the projection 130 will strike against the corresponding projection 131 on the ratchet 132, so that on the subsequent rotation of the ratchet 121 it, through the two engaging projections, will effect a rotation of the ratchet 132. The ratchet 132 is shown in Fig. 19 as occupying its normal position, at which time the upper cut-out space thereof will be opposite an actuating-pawl hereinafter described. When the ratchet 132 is rotated by the ratchet 121, this cut-out space will be carried beyond the pawl, so that when a guard hereinafter described is carried out of the path of the pawl the latter becomes effective to rotate the ratchet 132, whereby the mechanism for throwing the load-counterbalance out of action will become effective.

Fixedly secured to the rock-shaft 111 and rising therefrom is an arm 133. (See, for example, Fig. 12.) Normally the upper end of this arm bears against the uncut or solid portion of the circumference of the flange 128. When, however, the let-off or releasing notch 129 in said flange is brought opposite the upper end of said arm 133 by the rotation of the ratchet 121, said upper end will be snapped into said notch by the spring 134. (See, for example, Fig. 11.)

Upon the side of the supply-hopper 26 is mounted between its ends a rocker 135 (see, for example, Fig. 2) of approximately angular form, what might be considered the rear arm of the rocker being engaged each time the closer 6 is opened by the pin 136 on the disk or wheel 8, which pin constitutes a pivot for the rod 9. When the said rearward arm of the rocker is engaged, the forward arm thereof is elevated. This operation of the rocker 135 occurs each time the closer 6 is opened; but the rocker only accomplishes a desired result on the testing operation after the discharge of the twentieth load from the bucket 2.

Rigidly fastened to and rising from the rock-shaft 111 is an angular arm 137, (see, for example, Fig. 11,) to the approximately horizontal branch of which is pivoted the finger 138. When the upper end of the arm 133 is sprung into the let-off or releasing notch 129 after the recording of the twentieth load, the arm 137 is carried in a corresponding direction, the finger 138 of course moving with said arm 137, whereby a projection 139 on said finger is carried over a projection 140 on the forward arm of the rocker 135. The result will be that when the closer 6 is opened to permit the discharge of the twentieth load and when the rocker is operated through the primary agency of said closer the finger 138 will be lifted by the forward arm of said rocker by virtue of the engagement of the two projections 139 and 140. The purpose of this shifting of the finger 138 is to throw a guard hereinafter described into the path of the pawl 141, (see Fig. 8, for example,) which pawl is carried upon the continually-operating rocker 73. (See Fig. 11.) The said pawl 141 is shown in Fig. 11 as being in its normal position and playing in the upper cut-out space of the ratchet 132.

Loosely carried by the shaft 74 is a rocker 142, (shown best in Fig. 9,) the upper arm of which has an inwardly-extending flange 143, constituting a guard at a certain point for holding the pawl 141 out of action. The lower arm of the rocker 142 is connected with a link 144, united in turn to the depending arm 145, rigidly secured to the rock-shaft 146. The guard 143 is shown in Fig. 11 as occupying its normal position, it being at one side of the pawl 141, which during this time is playing back and forth in the cut-out space of the ratchet 132, and said guard is maintained in such position by a spring 147, connected with the rocker 142 and shown as being of the coiled type.

After a record has been taken of the twentieth load the ratchet 121 is fed a distance equaling one tooth, and during the said feeding movement the load is being positively discharged from the bucket. As the ratchet 121 makes such movement it is effective through the projection 130, which engages the projection 131 on the ratchet 132 to feed the latter a distance of one tooth, thereby carrying the upper cut-out space of said ratchet 132 away from the pawl 141. During this motion the arm 133 is released, as hereinbefore described, so that it can be swung inward by the spring 134, also causing the inward swinging of the angular arm 137, said arms 133 and 137 being fixed to the rock-shaft 111'. The shaft 111' is independent of the shaft 111.

As the arm 137 swings inward the finger 138 is carried therewith to move the projection 139 over the projection 140 on the forward arm of the rocker 135. (See Fig. 12.) During such motion of the arm 137 the lug 137' thereon strikes the lug 110' on the arm 110, moving the latter inward, and thereby rocking the shaft 111 to swing the arm 115 outward and carry the shoulder 116 thereon under the pin 117 on the weighted side of the primary beam 15, thereby to prevent the descent of said weighted side during the test, as if it did descend during such period the supply-controlling valves would be opened. The instant that the closer 6 is opened to effect the discharge of the load, which result is brought about as the arms 133 and 137 swing inward, the rocker 135 is operated by the pin 136 in the manner hereinbefore described, so as to elevate the finger 138. This finger 138 is situated under a finger 148 on the rock-shaft 146. When the finger 148 is lifted, and this operation occurs simultaneously with the discharge of the twentieth load and just after the ratchet 132 has been operated by the companion ratchet 121, the upper arm of the rocker 142 is swung inward by virtue of the connections with said finger 148, (see Fig. 9,) so as to carry the segmental guard 143 on said rocker under the vibrating pawl 141, whereby the pawl 141 is held out of action during the discharge of the twentieth load. The finger 148 is of course held up while the closer is open. When, however, the closer is practically shut, the pin 136 will have ridden off the rear arm of the rocker 135, so as to permit the forward arm of said rocker to drop, it being of greater weight than the rear arm to secure this result. As the forward arm of the rocker falls away from the finger 138 the finger 148 will be released, so that the spring 147 becomes effective for returning the rocker 142 to its original position, and as said rocker returns to such original position the guard 143, constituting a part thereof, is moved out of the path of the pawl 141, whereby the latter becomes effective to operate the ratchet 132. The ratchet 132, it will be understood, has been so operated by the companion ratchet 121 during the positive discharge of the twentieth load as to carry the upper uncut portion thereof away from the pawl 141. Therefore when the guard 143 is brought to its initial position after the discharge of the twentieth load the pawl 141 can operate the ratchet 132 a half-rotation, or approximately so, and during this motion of the ratchet the load-counterbalance 47 is thrown out of operative relation with the secondary scale-beam 23, as will hereinafter appear.

The lifter for the load-counterbalance 47 is shown as a lever 102. To the inner arm of said lever 102 is fulcrumed the substantially vertically disposed short lever 149, having a plate or disk 150 at its upper end, its lower end being connected to the guide-link 151, which in turn is connected to the framework of the machine. By virtue of the link 151 the lever 141 is maintained in a vertical position as the weight-lifting lever rises and falls, whereby during such motions the disk or plate 150 will be maintained in a horizontal position, so as to properly elevate the weight 47.

What is shown in Fig. 4 as the left arm of the weight-lifting lever 102 has a segmental portion 152 coöperative with a somewhat similar segmental member 153, eccentrically pivoted to the extreme front end of the shaft 174, to which, it will be remembered, the ratchet 132 is fixedly connected.

After the discharge of the twentieth load and after the guard 143 has been returned to its initial position the pawl 141 becomes effective for rotating the ratchet 132, and it does rotate said ratchet a half-rotation or until what is shown in Fig. 19 as the normally under cut-out space of said ratchet 132 is brought opposite said pawl 141. When the last-mentioned result ensues, the pawl 141, although continuously vibratory, becomes for the time being ineffective, as it is now playing in the under cut-out face of the ratchet 132. As the ratchet 132 is rotated a distance equaling half its teeth under the action of the pawl 141 the shaft 74 is of course being rotated in correspondence therewith, whereby the segmental member 153 on the outer end of said shaft by engaging the corresponding segmental portion 152 upon the outer arm of the lever 102 will depress said outer arm, thereby elevating the inner arm of the lever, whereby the disk 150 will be carried against the weight 47 during the first part of the motion and during the last part of the motion will lift said weight bodily and carry it out of working relation with the secondary beam 23. As the weight 47 is being moved out of working relation with its beam the latter is being balanced, the bucket 2 of course at this time being empty, the closer 6 shut, and the primary beam 15 locked against return movement.

During the testing of the balance or accuracy of the apparatus the supplemental poising means, consisting of the plungers 50 and their coöperating parts, are of course in action and operate precisely as in weighing, only when the bucket is empty they serve to compensate for or equalize any variation in poise of the weighing mechanism.

As previously stated, while the load-counterbalance is out of working relation with the weighing mechanism a test of the condition of said weighing mechanism is taken, and such test is indicated upon the recording-tape hereinbefore described.

During the operation of the lever 102 to effect the lifting of the weight 47 the bar or stem 101 of course is drawn downward by said lever, so as to impart a similar movement to the main printing member 87, whereby the abbreviation "Bal." on said main printing member is brought to the printing-point and in horizontal line with the pressure member 96, so that when the pressure member is put into action it presses the tape against the abbreviation "Bal.," as well as any character on the supplemental printing member that may be opposite the printing-point and in horizontal line with said abbreviation. The lever 102 is held in its normal position, or that represented in Fig. 4, by a coiled spring 154, surrounding the hub thereof, one terminal coil of the spring bearing against the framework of the machine and the other fitting into a perforation in said hub. This spring also returns the lever to its normal position.

The ratchet 71 carries a radial projection 155, rigid therewith, (see, for example, Fig. 11,) the ratchet 132 being provided with a similar projection 156. The function of these projections will now be set forth.

It will be remembered that after a load has been discharged the pawl 77 plays in the cut-out space of the ratchet 71. The function of the projection 156 is to engage the coöperating projection 155 to advance said ratchet 71 a distance equal to one tooth, so that said cut-out space will be carried away from the said pawl 77 in order that the latter may rotate said ratchet 71 one complete turn, or until said cut-out space again comes opposite the pawl. As the ratchet 132 is operated by the pawl 142 to effect the lifting of the load-counterweight 47 the radial projection 156 will of course be moved therewith, said projection during the lifting of the weight moving through half a circle, and during the latter part of said movement what is for the time being the upper end of the projection 156 will impinge against the projection 155, so as to swing the latter toward what is the right in Fig. 11, whereby the ratchet 71 is operated a distance sufficient to bring it under the action of the pawl 77, and during the rotation of the ratchet 71 at this time a record of the test is being made, the weight 47 being of course out of action with the weighing mechanism.

As the ratchet 71 rotates the pressure member 96 is moved toward and from the printing members 87 and 88, respectively. When the pressure member has reached its extreme retracted position, the cut-out space of the ratchet 71 will be brought opposite the pawl 77, whereby the said ratchet is again thrown out of action, the guard 79 during this period holding the pawl 78 out of action. At the time the weight 47 is lifted or has reached its extreme upward position what is represented in Fig. 19 as the lower cut-out space in the ratchet 121 will be opposite the pawl 141, so that the latter during the test cannot operate the ratchet 121 to permit return of the weight to its primary position. Just about the time the ratchet 71 has resumed its normal position after the recording of the test the radial projection 155 thereon will strike the radial projection 156 on the ratchet 132, thereby carrying the cut-out portion of said ratchet 132 away from the pawl 141 and bringing a tooth into the range of action of said pawl, which of course is vibratory. The pawl 141 then rotates the ratchet 132 a half of a circle, or until said ratchet 132 resumes the position shown in Fig. 19, what is shown in said Fig. 19 as the upper cut-out space being at the end of the second half of rotation of the ratchet 132 brought opposite said pawl 141. As the ratchet 132 operates during the second half of its rotation the shaft 74 is correspondingly rotated, so that the segmental portion 153 thereon will move away from the corresponding segmental portion 152 on what is shown in Fig. 4 as the left arm of the lever 102, whereby the spring 154 acting against said lever will lower the right arm thereof, or that which directly carries the counterweight 47. As said right arm of the lever 102 is lowered the weight 47 will be restored to its original condition.

On the discharge of the twentieth load the tape containing the record of such twentieth load is advanced a distance equaling one tooth of the ratchet 121. After the weight 47 has been elevated to the limit of its upward movement and while it is in such position and naturally before it is lowered to its original location the record of the test made for indicating a balance or accuracy of the weighing mechanism is recorded, and the said record is made by the single rotation of the ratchet 71 under the action of the pawl 77. During the rotation of the ratchet 71 by the pawl 77 as a test is being made and a record thereof taken the ratchet 132 is at rest, the pawl 141 playing in what is shown in Fig. 11 as the upper cut-out or mutilated portion of the ratchet 132; but the ratchet 121 will be rotated one tooth after the record of the test is taken.

After an impression has been made on the tape of the condition or balance of the weighing mechanism and while the ratchet 71 is rotating the projection 155 on said ratchet 71 will strike the projection 156 on the ratchet 132, thereby carrying what is for the time being the upper cut-out or mutilated portion of the ratchet 132 from opposite the continuously-vibratory pawl 141 and bringing into the range of action of said pawl 141 the first tooth immediately behind said cut-out or mutilated portion. The pawl 141 can then rotate the ratchet 132 through half of a circle, or until what is shown in Fig. 11 as the lower mutilated portion of said ratchet 132 is brought opposite said pawl 141, at which point the ratchet 132 will be again at rest and will remain so until a test is to be taken, which, as hereinbefore set forth, occurs after the making up, recording, and discharging of twenty loads.

During the second stage of rotation of the intermittently-moving ratchet 132 the upper end of the arm 133 will be thrust out of the notch 129 in the ratchet 121 by said ratchet 132, thereby rocking the shaft 111. The operation of the ratchet 121 by the ratchet 132 at this point is brought about by the engagement of the projection 131 on said ratchet 132 with the coöperating projection 130 on the ratchet 121. Just before the ratchet 132 has completed the second half of its rotation the projection 131 thereon will be carried against the projection 130, whereby on the continued motion of said ratchet 132 or as it finishes its second stage of motion the projection 131 by engaging the projection 130 will advance the ratchet 121 a distance equaling one tooth. When said feed has been imparted to the ratchet 121 by the ratchet 132, the cut-out space in said ratchet 132 will be opposite the pawl 141, so that beyond this point or until a test is made the ratchet 132 will not be operated. The ratchet 121, however, is operated after each load-record is made, and such rotation continues until the projection 130 strikes the projection 131, whereby the two ratchets are, in effect, coupled and whereby when the ratchet 121 is moved the ratchet 132 will be also moved to bring the latter under the action of the continuously-vibratory pawl 141. As the shaft 111 rocks the arms 137 and 115 are returned to their initial positions, the projection 139 on the finger 138, carried by said arm, being moved from off the projection 140 on the rocker 135 as said arm 137 is retracted. During this motion the arm 115 is swung inward to carry the shoulder 116 thereon from under the pin 117 on the counterweighted side of the primary scale-beam 15, whereby the weighted end of the latter can drop to effect the feed of material into the empty bucket 2, which is brought about by the opening of the two valves 27 and 28 in the manner hereinbefore set forth.

The spring-detent 157 prevents (see Fig. 11, for example) retractive motion of the ratchet 132.

After a test has been made as hereinbefore set forth the tape upon which the record of the test is taken is fed one step by the pawl 127, the said pawl being of course operated each time that the ratchet 71 makes a complete turn. As the ratchet 121 is operated in the manner hereinbefore set forth to swing the arm 133 as described it moves a distance equaling one tooth, thereby imparting through the intermediate mechanism a like movement to the tape. Therefore the tape is moved one step after the record of a test has been taken and is moved a second step before a succeeding load is weighed, the second step taking place just before the counterweight 47 reaches its initial position. Therefore there will be a clear or non-printed space on the tape between the record of each test and the record of a succeeding load. In fact, at intervals the said tape is fed abnormal distances.

It will be understood that the second step imparted to the tape after a record of the test has been made is brought about by the ratchet 132 in the manner hereinbefore described.

I have set forth at length hereinbefore the various operations that occur during the normal action of the machine and while the accuracy of the weighing mechanism thereof is being tested. It might be stated that the order of operations is as follows: The load-carrier of the weighing mechanism is loaded, a record is taken of each load, following which the latter is positively and mechanically discharged. This procedure takes place for a desired number of charges or drafts—say twenty. When twenty charges or drafts have been weighed, recorded, and delivered, the accuracy or balance of the weighing mechanism is tested and a record made of the test, following which the normal conditions are again resumed. The parts are so timed and organized that these several operations take place in proper sequence and automatically.

Having thus described my invention, what I claim as new, and desire to secure by Letters Patent, is—

1. The combination of weighing mechanism including a load-receiver, and primary and secondary scale-beams, stream-supplying means for the load-receiver, stream-controlling means governed by the primary scale-beam, the secondary scale-beam serving to effect the weighing of the load and having means associated therewith for automatically counterpoising said load, and means for throwing the primary scale-beam out of working relation with the load-receiver during the time the counterpoising means of the secondary scale-beam is acting to balance the load.

2. A weighing apparatus having a load-receiver and primary and secondary scale-beams, the secondary scale-beam serving to weigh a load and having means associated therewith for automatically counterpoising said load, and means for throwing the primary scale-beam out of operative relation with the load-receiver during the time the counterpoising means of the secondary scale-beam is acting to balance the load in said load-receiver.

3. The combination of weighing mechanism including a load-receiver and independently-mounted primary and secondary scale-beams, the secondary scale-beam having means associated therewith for automatically counterpoising the load, stream-supplying means for the load-receiver, stream-controlling means governed by the primary scale-beam, and means for throwing the primary scale-beam out of action at a predetermined point in the descent of the load-receiver and for maintaining it out of working relation therewith during the final part of the descent thereof and while the load is being balanced by the counterpoising means of the secondary scale-beam.

4. The combination of weighing mechanism including a load-receiver and primary and secondary scale-beams, the primary scale-beam having a weight of a mass to underbalance a predetermined load, and the secondary scale-beam having a weight of a mass to balance such predetermined load, stream-supplying means for the load-receiver, stream-controlling means governed solely by the primary scale-beam, and means for throwing the primary scale-beam out of working relation with the load-receiver during the time the load is being balanced through the secondary scale-beam.

5. A weighing apparatus having a load-receiver and primary and secondary scale-beams, the secondary scale-beam having means associated therewith for automatically counterpoising the load, the secondary scale-beam serving alone in weighing a load, means for throwing the primary scale-beam out of working relation with the load-receiver during the time the counterpoising means of the secondary scale-beam is acting to balance the load, and supplemental poising means coöperative with the secondary scale-beam.

6. A weighing apparatus having a load-receiver and primary and secondary scale-beams, the secondary scale-beam serving to weigh a load, means for throwing the primary scale-beam out of working relation with the load-receiver and for holding it out of such relation during the final descending movement of the load-receiver, a pair of communicating liquid-receiving cups, and plungers arranged to work in said cups and operatively connected with the secondary scale-beam at opposite sides of the axis of motion thereof.

7. A weighing apparatus having a load-receiver and primary and secondary scale-beams, the secondary scale-beam serving in weighing a load and having means associated therewith for automatically counterpoising said load, means for throwing the primary scale-beam out of working relation with the load-receiver during the final part of the descent of the latter, and recording mechanism operative with said secondary scale-beam.

8. The combination of weighing mechanism including a load-receiver and primary and secondary scale-beams, the secondary scale-beam having means associated therewith for automatically counterpoising the load, stream-supplying means for the load-receiver, stream-controlling means governed solely by the primary scale-beam, means for throwing the primary scale-beam out of working relation with the load-receiver during the final part of the descent of the latter, the counterpoising means of the secondary scale-beam serving the load while the primary scale-beam is out of such working relation, means for effecting the discharge of the load, and means for locking the primary scale-beam against return movement when the load is discharged.

9. The combination of weighing mechanism including a load-receiver and primary and secondary scale-beams, the said scale-beams being independently supported, direct but loose connecting means between the two beams, whereby the secondary beam can operate independently of the primary scale-beam, and means for throwing the primary scale-beam out of working relation with the load-receiver during the final part of the descent of the latter, the secondary scale-beam serving alone in balancing the load when made up and during the time the primary scale-beam is out of action.

10. The combination of weighing mechanism including a load-receiver and primary and secondary scale-beams, stream-supplying means for the load-receiver, stream-controlling means governed by the primary scale-beam, means for throwing the primary scale-beam out of action at a predetermined point, the secondary scale-beam serving to effect the weighing of the load after the primary scale-beam is out of action, means for effecting the discharge of the load, and independent mechanisms for maintaining the primary scale-beam in its advanced position, one mechanism being active as the load is discharged and the other being active during the time the load is being discharged.

11. A weighing apparatus having a load-receiver and primary and secondary scale-beams, the secondary scale-beam serving to weigh a load, means for throwing the primary scale-beam out of working relation with the load-receiver during the final part of the descent of said load-receiver and for holding it out of such working relation during such period, the secondary scale-beam being operative to balance the load while the primary scale-beam is out of said working relation, and a printing member carried by said secondary scale-beam.

12. A weighing apparatus having a load-receiver and primary and secondary scale-beams, the secondary scale-beam serving to weigh a load, means for throwing the primary scale-beam out of action at a predetermined point, the secondary scale-beam serving to balance the load when the primary scale-beam is out of action and being oscillatory, communicating cups to contain a liquid, plungers in said cups, connected with the secondary beam at opposite sides of its center of motion, and printing means connected with the secondary scale-beam.

13. A weighing apparatus having a load-receiver and primary and secondary scale-beams, the secondary scale-beam serving in weighing a load, means for throwing the primary scale-beam out of action during the latter part of the descent of the load-receiver and for holding it out of action during the remainder of such descent, and mechanism coöperative with the secondary scale-beam for securing records of the loads.

14. A weighing apparatus having primary and secondary scale-beams, the secondary scale-beam being oscillatory and serving to weigh a load, means for throwing the primary scale-beam out of action at a certain point, whereby the secondary scale-beam will become solely effective, plungers connected with the secondary scale-beam at opposite sides of its center of motion, communicating vessels to receive said plungers and to contain a liquid, and recording mechanism operative with the secondary scale-beam.

15. Weighing mechanism having an oscillatory beam, plungers connected with the beam at opposite sides of its center of motion, said plungers being of inverted-cup form and each having a perforation, and communicating vessels to receive said plungers and to contain a liquid, a portion of the plungers being immersed in the liquid.

16. A weighing apparatus having a load-receiver and primary and secondary scale-beams, the secondary scale-beam having a load-counterbalance, means for throwing the primary scale-beam out of action at a predetermined point in the descent of the load-receiver, and means for intermittently throwing said load-counterbalance out of working relation with the secondary beam.

17. The combination of weighing mechanism having a load-receiver and primary and secondary scale-beams, the secondary scale-beam having a load-counterweight, means for throwing the primary scale-beam out of working relation at a predetermined point in the descent of the load-receiver, and means for intermittently lifting said load-counterweight.

18. The combination of weighing mechanism having a load-receiver and primary and secondary oscillatory scale-beams, the secondary scale-beam having a load-counterbalance, means for intermittently throwing the load-counterbalance out of working relation with the secondary beam, means for throwing the primary scale-beam out of action at a predetermined point in the descent of the load-receiver, the secondary scale-beam being solely effective in the counterbalancing of the load, communicating cups to contain a liquid, plungers fitted in said cups and connected with the secondary beam at opposite sides of the center of motion thereof, and recording means coöperative with the secondary beam.

19. The combination of weighing mechanism including a load-receiver and primary and secondary scale-beams, the secondary scale-beam serving to balance a load, means for throwing the primary scale-beam out of working relation at a predetermined point in the descent of the load-receiver and for maintaining it out of such working relation during the remainder of such descent, to cause the secondary scale-beam to be solely effective, and power-operated means controlled by said secondary scale-beam for positively effecting the discharge of the load.

20. The combination of weighing mechanism, a mutilated ratchet having a plurality of teeth at opposite sides of the mutilated portion thereof, a pair of power-driven pawls for said ratchet, one of which normally works upon the mutilated portion of the ratchet, holding means for normally holding the other pawl out of engagement with the ratchet, and means controlled by the weighing mechanism for operating said holding means to release the last-mentioned pawl and permit the latter to engage said ratchet.

21. The combination of weighing mechanism, a mutilated ratchet, a power-driven pawl normally working upon the mutilated portion of the ratchet, means operative with the weighing mechanism for causing the ratchet to move independently of said pawl to bring the teeth of the ratchet under the action of the pawl to effect the rotation of the ratchet, and recording means operative with the ratchet.

22. The combination of weighing mechanism including a load-receiver, a mutilated ratchet, a power-driven pawl normally working upon the mutilated portion of the ratchet, mechanism operative with the weighing mechanism for causing the ratchet to turn and bring the teeth thereof under the action of the pawl, recording mechanism operative with the ratchet, and mechanism also operative with said ratchet for effecting the discharge of material from the load-receiver.

23. A mutilated ratchet having a plurality of teeth at opposite sides of the mutilated portion thereof, a pair of pawls, one of which normally works against the mutilated portion of the ratchet, holding means for normally holding the other pawl out of engagement with the ratchet, and mechanism for operating the holding means to release the last-mentioned pawl and permit it to engage the ratchet.

24. The combination of weighing mechanism, a mutilated ratchet having a plurality of teeth at opposite sides of its mutilated portion, a pair of power-driven pawls for said ratchet, one of which normally works upon the mutilated portion of the ratchet, a guard for normally holding the other pawl out of engagement with the teeth of said ratchet, and means coöperative with the weighing mechanism for operating said guard to effect the release of the last-mentioned pawl, the latter, when released, serving to actuate the ratchet.

25. The combination of weighing mechanism, a mutilated ratchet having a plurality of teeth at opposite sides of its mutilated portion, a pair of rockers, one of which operates the other, power-driven mechanism for actuating one of the rockers, a pawl mounted upon each rocker, one pawl normally working against the mutilated portion of said ratchet, a guard for normally holding the other pawl out of action, and mechanism, operative with the weighing mechanism, for shifting the guard in a direction to release the coöperating pawl, whereby the latter can engage the teeth of the ratchet to operate the same.

26. The combination of weighing mechanism, a mutilated ratchet having a plurality of teeth at opposite sides of its mutilated portion, a pair of power-driven pawls for said ratchet, one of which normally works upon the mutilated portion of the ratchet, a guard in position to normally hold the other pawl out of action, and mechanism operative with the weighing mechanism for actuating the guard in a direction to release its pawl, whereby the latter will become effective to operate the ratchet.

27. The combination of weighing mechanism, a mutilated ratchet, a pair of power-driven pawls for said ratchet, one of which normally works upon the mutilated portion of the ratchet, and a guard for normally holding the other pawl out of action, an operating member for the last-mentioned pawl, a latch engaging the operating member to hold the same in its normal position, and means operative with the weighing mechanism for tripping the latch, thereby to release the operating member, whereby it will shift the guard to effect the release of the pawl coöperative therewith.

28. The combination of weighing mechanism, a mutilated ratchet, a pair of power-driven pawls for said ratchet, one of which normally works upon the mutilated portion of the ratchet, a guard normally holding the other pawl against action, a gravitative operating member for said guard, a latch serving to normally hold the gravitative operating member against movement, and means operative with the weighing mechanism for tripping said latch.

29. The combination of weighing mechanism including a load-receiver, stream-supplying means for the load-receiver, stream-controlling means governed by the weighing mechanism, a mutilated ratchet, a pair of power-driven pawls for said ratchet, one of which normally works upon the mutilated portion of the ratchet, a guard normally holding the other pawl out of action, an operating member for said guard, a latch for holding the operating member in its normal position, and means actuated by the stream-controlling means for tripping the latch.

30. The combination of weighing mechanism including a load-receiver and primary and secondary scale-beams, means for locking the primary scale-beam against movement at a predetermined point in the descent of the load-receiver, the secondary scale-beam, on the further descent of the load-receiver being effective to weigh the load, a mutilated ratchet, a pair of power-driven pawls for said ratchet, one of which normally works upon the mutilated portion of the ratchet, a guard for normally holding the other pawl out of engagement with said ratchet, and means operative with the weighing mechanism for shifting said guard to permit the last-mentioned pawl to engage the ratchet, and after the primary scale-beam is thrown out of action.

31. The combination of weighing mechanism including a load-receiver, a movably-mounted member having effective and ineffective portions, a power-driven operating element for said movably-mounted member, normally working against the ineffective portion of the same, means for actuating one of said two last-mentioned parts with respect to the other, to bring the effective portion of said movably-mounted member under the action of the power-driven element, the latter, when effective, serving to impart a step-by-step motion for a predetermined length of time to said movably-mounted member, and means actuated by said movably-mounted member for effecting the discharge of the contents of the load-receiver.

32. The combination of weighing mechanism including a load-receiver, a movably-mounted member having effective and ineffective portions, a power-driven operating element for said movably-mounted member, normally working against the ineffective portion of the same, means for actuating one of said two last-mentioned parts with respect to the other, to bring the effective portion of said movably-mounted member under the action of the power-driven element, whereby the latter will operate the former, a cam operative in unison with said movably-mounted member, and means actuated by said cam for effecting the discharge of the contents of the load-receiver.

33. The combination with weighing mechanism including a bucket provided with a closer, and a toggle for normally holding the closer shut, a mutilated ratchet, a power-driven pawl normally working upon the mutilated portion of the ratchet, means independent of the pawl for turning the ratchet at a predetermined point to bring the teeth thereof under the action of the ratchet, whereby the latter will be operated, and means operative with the ratchet for breaking said toggle.

34. The combination of weighing mechanism including a load-receiver, a mutilated ratchet having a plurality of teeth at opposite sides of its mutilated portion, a pair of power-driven pawls, one of which normally works against the mutilated portion of the ratchet, a guard for normally holding the other pawl out of action, means for operating the guard at a predetermined point to put its coöperating pawl into action, and mechanism operative with the ratchet for effecting the discharge of a load from the load-receiver.

35. The combination of weighing mechanism including a load-receiver, a mutilated ratchet, a pair of power-driven pawls, one of which normally works against the mutilated portion of the ratchet, a guard for normally holding the other pawl out of action, means for shifting the guard at a predetermined point to release the coöperating pawl, whereby the latter will operate the ratchet, a cam, a rock-shaft having an arm in position to be operated by said cam for rocking the shaft, and a second arm also carried by the shaft, provided with means for effecting the discharge of the load.

36. The combination of weighing mechanism including a load-receiver and a counterweighted beam, a mutilated ratchet, a pair of power-driven pawls, one of which normally works against the mutilated portion of the ratchet, a guard for normally holding the other pawl out of action, means for releasing the last-mentioned pawl at a predetermined point, whereby it becomes effective to operate the ratchet, and mechanism operative with the ratchet for locking the beam against return movement and for also effecting the discharge of the load from the load-receiver.

37. The combination of weighing mechanism including a load-receiver and a counterweighted beam, the latter having a projection, a rock-shaft provided with a shouldered arm, a mutilated ratchet, a pair of pawls one of which normally plays against the mutilated portion of the ratchet, a guard for holding the other pawl normally out of action, means for shifting the guard thereby to effect the release of the coöperating pawl, whereby the latter will become effective to actuate its ratchet, and mechanism operative with the ratchet for rocking said shaft to move the shoulder of the arm thereon into engagement with said projection.

38. The combination of weighing mechanism including a load-receiver, and a counterweighted beam, a movably-mounted member having effective and ineffective portions, a power-driven operating element for said movably-mounted member normally working against the ineffective portion thereof, means for actuating one of said last two mentioned parts to bring the effective portion of said movably-mounted member into position for operation by said operating element, a rock-shaft provided with a beam-locking element, and mechanism operative with the movably-mounted member for actuating the rock-shaft in a direction to throw said locking element into its effective position.

39. The combination of weighing mechanism including a load-receiver and a counterweighted beam, a movably-mounted member having effective and ineffective portions, a power-driven operating element for said movably-mounted member, normally working against the ineffective portion of said movably-mounted member, means for actuating one of said last two mentioned parts with respect to the other to bring the effective portion of the said movably-mounted member under the action of its operating element, a rock-shaft provided with an arm, spring-actuated in one direction, means operative with said movably-mounted member to actuate said arm in opposition to its spring, and subsequently to permit the return of said arm to its initial position by said spring, and beam-locking means movable into an effective position when said spring-actuated arm is operated through the intervention of said movably-mounted member.

40. The combination of weighing mechanism including a load-receiver and a counterweighted beam, a movably-mounted member having effective and ineffective portions, a power-driven operating element for said movably-mounted member, normally working against the ineffective portion thereof, means for actuating one of said last two mentioned parts with respect to the other to bring the effective portion of said movably-mounted member under the action of its operating element, means operative with said movably-mounted member for effecting the discharge of the load and for also momentarily locking the said beam against return movement, and means operative on the discharge of the load for locking the beam against return movement while the load is being discharged.

41. The combination of weighing mechanism, stream-supplying means therefor, stream-controlling means, an arm connected with the stream-controlling means and provided with a trip device, a latch normally engaging the arm, a trip device operative with the beam for operating said latch in a direction to trip the same, a shaft having a loosely-mounted pendent arm in position for engagement by said first-mentioned trip device, an arm rigidly mounted upon said shaft for engagement by said pendent arm, power-driven mechanism for effecting the discharge of the load, a member for normally holding the power-driven mechanism out of action, a latch for normally holding said last-mentioned member in its ineffective position, and means connected with the shaft for operating said latch.

42. The combination of weighing mechanism, stream-supplying means therefor, stream-controlling means, an arm connected with the stream-controlling means and provided with a trip device, a latch normally engaging the arm, a trip device operative with the beam for operating said latch in a direction to trip the same, a shaft having a loosely-mounted pendent arm in position for engagement by said first-mentioned trip device, an arm rigidly mounted upon said shaft for engagement by said pendent arm, power-driven mechanism for effecting the discharge of the load, a member for normally holding the power-driven mechanism out of action, a latch for normally holding said last-mentioned member in its ineffective position, and a spring-actuated rocker rigidly fastened to said shaft and operatively connected with said last-mentioned latch.

43. The combination of weighing mechanism including a load-receiver and an oscillatory beam, provided with a stub-shaft coincident with the axis of motion of said beam, valve mechanism having an arm provided with a trip device, a spring-actuated latch loosely carried by said stub-shaft for normally engaging said arm, a trip device for said latch, rigidly mounted on the stub-shaft, a second shaft loosely carrying a pendent arm in position for engagement by said first-mentioned trip device, a second arm rigidly carried by said last-mentioned shaft and provided with an offset engaged by said pendent arm, power-actuated, load-discharging means normally out of action, a member normally holding the load-discharging means out of action, a latch for maintaining the last-mentioned member in its ineffective position, and connections between said last-mentioned latch and said last-mentioned shaft.

44. The combination of a movably-mounted member having effective and ineffective portions, a continuously-movable operating element for imparting a step-by-step movement to said movably-mounted member normally working against the ineffective portion thereof, means for actuating one of said parts with respect to the other, whereby the effective portion of the movably-mounted member will be brought under the action of its operating element, and recording mechanism operable by said movably-mounted member.

45. The combination of weighing mechanism, a movably-mounted member having effective and ineffective portions, a continuously-movable operating element for imparting a step-by-step movement to said movably-mounted member, normally working against the ineffective portion thereof, means for actuating one of said two last-mentioned parts with respect to the other, whereby the effective portion of the movably-mounted member will be brought under the action of its operating element, recording means having a printing device, and feeding mechanism for a tape or ribbon, operable by said movably-mounted member.

46. The combination of weighing mechanism, a movably-mounted member having effective and ineffective portions, a continuously-movable operating element for imparting a step-by-step movement to said movably-mounted member, normally working against the ineffective portion thereof, means for actuating one of said two last-mentioned parts with respect to the other, whereby the effective portion of the movably-mounted member will be brought under the action of its operating element, recording means having a printing device, and mechanism operable by said movably-mounted member for feeding a tape or ribbon step by step.

47. The combination of weighing mechanism, a mutilated ratchet, a power-driven pawl normally working upon the mutilated portion of the ratchet, mechanism for actuating the ratchet at a predetermined point to bring the teeth thereof under the action of the pawl, recording means having a printing member, a feed device for a tape or ribbon, pawl-and-ratchet means for operating the feed device, and means actuated by the mutilated ratchet for operating said last-mentioned pawl.

48. The combination of weighing mechanism including a scale-beam provided with a load-counterweight, recording means having main and auxiliary printing members, the auxiliary member being connected with the scale-beam, and the main printing member being mounted independently of the weighing mechanism, a lever directly connected with the main printing member, and mechanism for intermittently operating the lever to cause it to shift the main printing member and simultaneously lift the said weight.

49. The combination of weighing mechanism having a scale-beam provided with a load-counterweight, recording means having a main printing member and an auxiliary printing member, the auxiliary printing member being connected with the weighing mechanism, and the main printing member being supported independently of the weighing mechanism, said recording means also having a pressure member adapted to press a tape or its equivalent against the characters upon the printing members, means for operating the pressure member, a lever directly connected with the main printing member, and mechanism for intermittently operating said lever to cause it to shift the main printing member and simultaneously lift the weight.

50. The combination of weighing mechanism including a scale-beam provided with a load-counterweight, recording means having main and auxiliary printing members, the auxiliary printing member being connected with the weighing mechanism for operation thereby, a lever connected with the main printing member for shifting the same and having a segmental portion, a shaft also provided with a segmental portion to engage and operate the other one, and mechanism for intermittently rotating the shaft to operate the lever, the lever, when operated, serving to lift said weight.

51. The combination of weighing mechanism having a load-counterbalance, a movably-mounted member having effective and ineffective portions, a power-driven member for operating said movably-mounted member and normally working against the ineffective portion thereof, means for actuating one of said two last-mentioned parts with respect to the other to bring the effective portion of said movably-mounted member under the action of its operating element, primary and secondary ratchets, the secondary ratchet being mutilated and operable by the primary ratchet at a predetermined point, pawls for said ratchets, the pawl for the primary ratchet being operable by said movably-mounted member, and the pawl for the secondary ratchet normally playing against the mutilated portion thereof, said last-mentioned pawl being rendered effective when the secondary ratchet is operated by the primary one, to actuate the secondary ratchet, and means operative with the secondary ratchet for throwing the load-counterbalance out of working relation with the weighing mechanism.

52. The combination of weighing mechanism having a load-counterweight, a movably-mounted member having effective and ineffective portions, a power-driven member for operating said movably-mounted member and normally working against the ineffective portion thereof, means for actuating one of said two last-mentioned parts with respect to the other to bring the effective portion of said movably-mounted member under the action of its operating element, primary and secondary ratchets, the secondary ratchet being mutilated and operable by the primary ratchet at a predetermined point, pawls for said ratchets, the pawl for the primary ratchet being operable by said movably-mounted member, and the pawl for the secondary ratchet normally playing against the mutilated portion thereof, said last-mentioned pawl being rendered effective when the secondary ratchet is operated by the primary one, to actuate the secondary ratchet, a lifter for the counterweight, and mechanism operable by said secondary ratchet to actuate the lifter in a direction to elevate said counterweight.

53. The combination of weighing mechanism including a load-counterbalance, a ratchet, means operative with the weighing mechanism for actuating said ratchet on each operation of the weighing mechanism, a second ratchet having mutilated portions, a power-driven pawl normally working against one of the mutilated portions of the second ratchet, mechanism actuated by the first ratchet for moving the second ratchet to bring the teeth thereof under the action of the coöperating pawl, and means operated by the second ratchet for throwing said load-counterbalance out of action.

54. The combination of weighing mechanism including a load-counterbalance, a ratchet having mutilated portions, a power-driven pawl normally working against one of the mutilated portions of said ratchet, mechanism for actuating said ratchet with respect to the pawl to bring the teeth thereof under the action of said pawl, whereby the pawl will rotate the ratchet until the other mutilated portion thereof is brought opposite said pawl, means for again actuating the ratchet to bring a second series of teeth under the action of the pawl, whereby the latter will operate the ratchet until the first-mentioned mutilated portion is opposite the pawl, and mechanism operable for throwing the load-counterbalance out of action on the first motion of the ratchet and for effecting the return of the load-counterbalance to its initial position on the second motion of said ratchet.

55. The combination of weighing mechanism including a load-counterbalance, a ratchet having mutilated portions, a power-driven pawl normally working against one of the mutilated portions of said ratchet, mechanism for actuating said ratchet with respect to the pawl to bring the teeth thereof under the action of said pawl, whereby the pawl will rotate the ratchet until the other mutilated portion thereof is brought opposite said pawl, means for again actuating the ratchet to bring a second series of teeth under the action of the pawl, whereby the latter will operate the ratchet until the first-mentioned mutilated portion is opposite the pawl, mechanism operable for throwing the load-counterbalance out of action on the first motion of the ratchet and for effecting the return of the load-counterbalance to its initial position on the second motion of said ratchet, mechanism for discharging a load from the weighing mechanism, and means for momentarily throwing said pawl out of action on the discharge of the load.

56. The combination of a ratchet having mutilated portions and a power-driven pawl normally working against one of the mutilated portions of the ratchet, a second ratchet having means for intermittently operating the first ratchet to bring the teeth thereof under the action of said pawl, a third ratchet having a mutilated portion, a continually-operative pawl for the third ratchet, means for operating the third ratchet with respect to its pawl to bring the teeth thereof under the action of said last-mentioned pawl, and means carried by each of the first and third ratchets for operating the other.

57. The combination of weighing mechanism including a load-receiver and a counterbalance, a mutilated ratchet, a pair of power-driven pawls, one of which normally works against the mutilated portion of said ratchet, a guard for normally holding the other pawl out of action, means for shifting said guard at a predetermined point, a second ratchet, a pawl operable by the first ratchet for actuating the second ratchet, a third ratchet having mutilated portions, a power-driven pawl normally working against the mutilated portion of said third ratchet, the first and third ratchets each having independent devices for actuating the other, mechanism operable with the third ratchet for throwing the load-counterbalance out of working relation with the weighing mechanism and for subsequently permitting the return of the same to its initial position, a guard for the pawl of the third ratchet, and mechanism operable after a determined number of discharges from the weighing mechanism for momentarily throwing said guard into position to block the action of its coöperating pawl.

58. The combination of weighing mechanism having a load-receiver and a load-counterbalance, a ratchet having a mutilated portion, a power-driven pawl for said ratchet normally working against the said mutilated portion, mechanism for intermittently operating said ratchet to bring the teeth thereof under the action of said pawl to secure the rotation of the ratchet, mechanism actuated by said ratchet for throwing the load-counterbalance out of action, and a guard, and means operable on and during the discharge of a load for shifting said guard into position to hold said pawl out of action.

59. The combination of weighing mechanism having a load-receiver and a load-counterbalance, a ratchet having a mutilated portion, a power-driven pawl for said ratchet normally working against the said mutilated portion, mechanism for intermittently operating said ratchet to bring the teeth thereof under the action of said pawl to secure the rotation of the ratchet, mechanism actuated by said ratchet for throwing the load-counterbalance out of action, a guard, means operable on and during the discharge of a load for shifting said guard into position to hold said pawl out of action, and a recording means operative when the load-counterbalance is out of action.

60. The combination of weighing mechanism including a load-receiver and primary and secondary scale-beams, the secondary scale-beam serving in weighing a load, mechanism for throwing the primary scale-beam out of action at a predetermined point in the descent of the load-receiver and for holding it out of action during the remainder of such descent, the secondary scale-beam being solely effective during the time the primary scale-beam is out of action, and mechanism for recording the loads and for intermittently testing the accuracy of the weighing mechanism.

In testimony whereof I have hereunto set my hand in presence of two subscribing witnesses.

ULYSSES S. JAMES.

Witnesses:
J. PARKES,
M. A. PERIN.